July 4, 1933.  E. L. JONES  1,916,981
RECEPTACLE MAKING APPARATUS
Filed Sept. 21, 1929  16 Sheets-Sheet 3
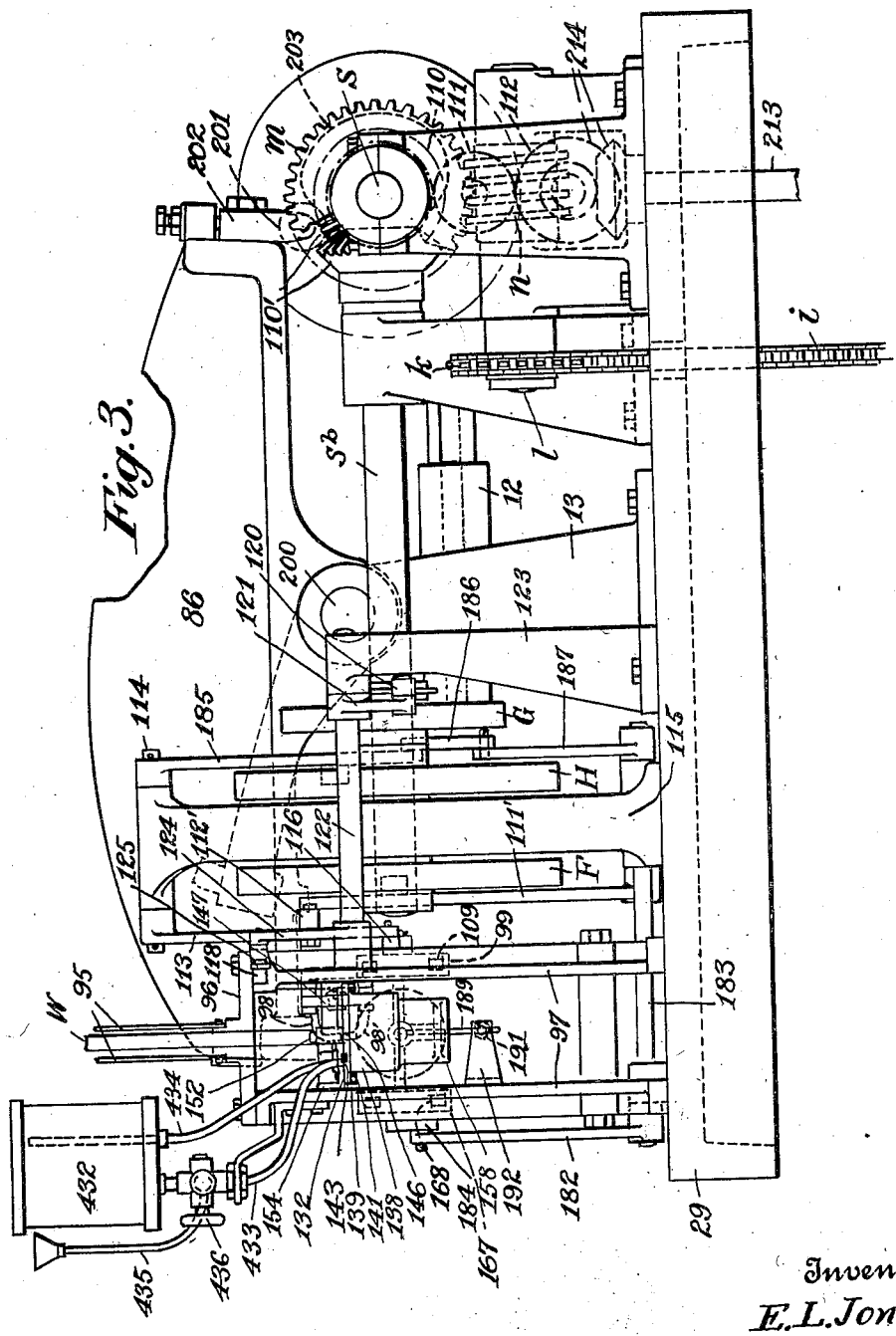
Inventor
E. L. Jones
By his Attorney
John O. Seifert

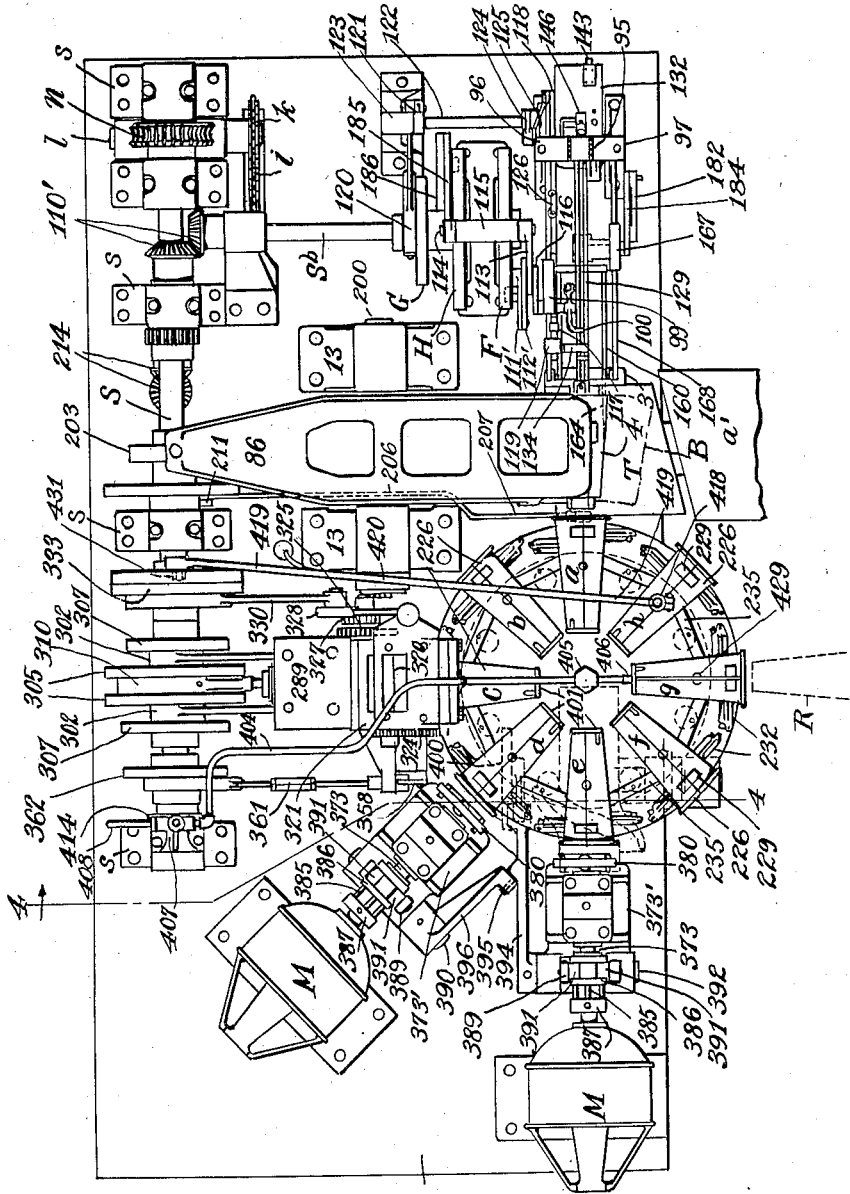

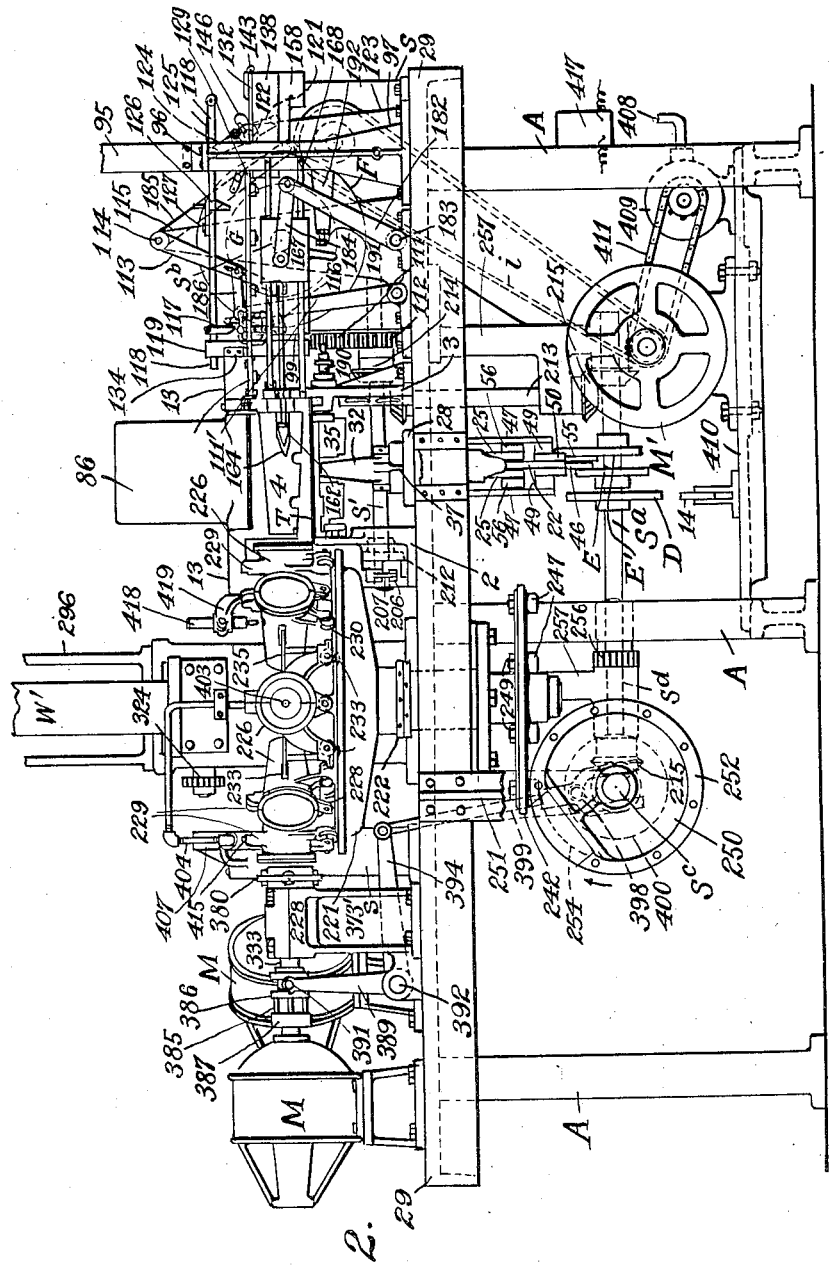

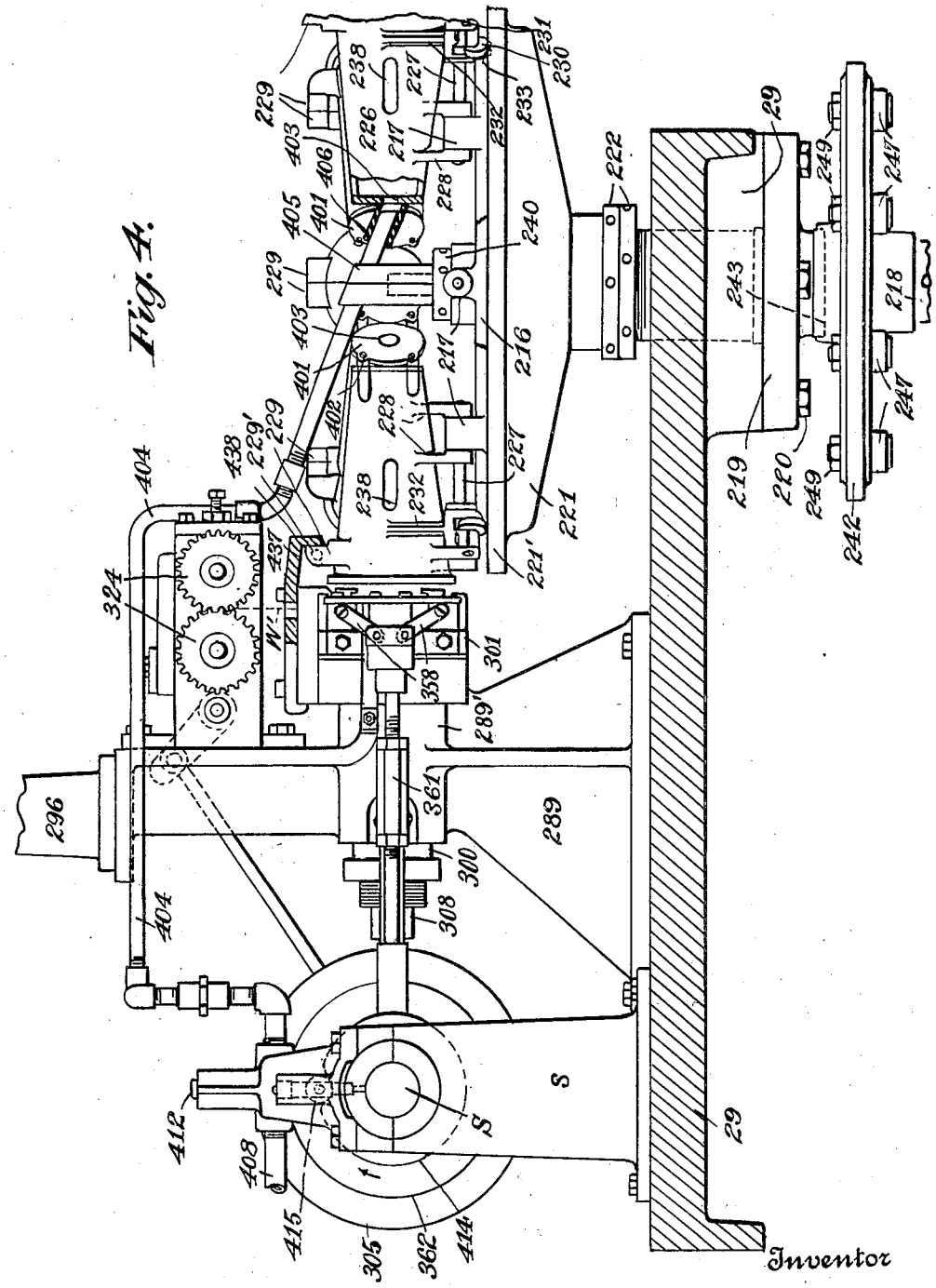

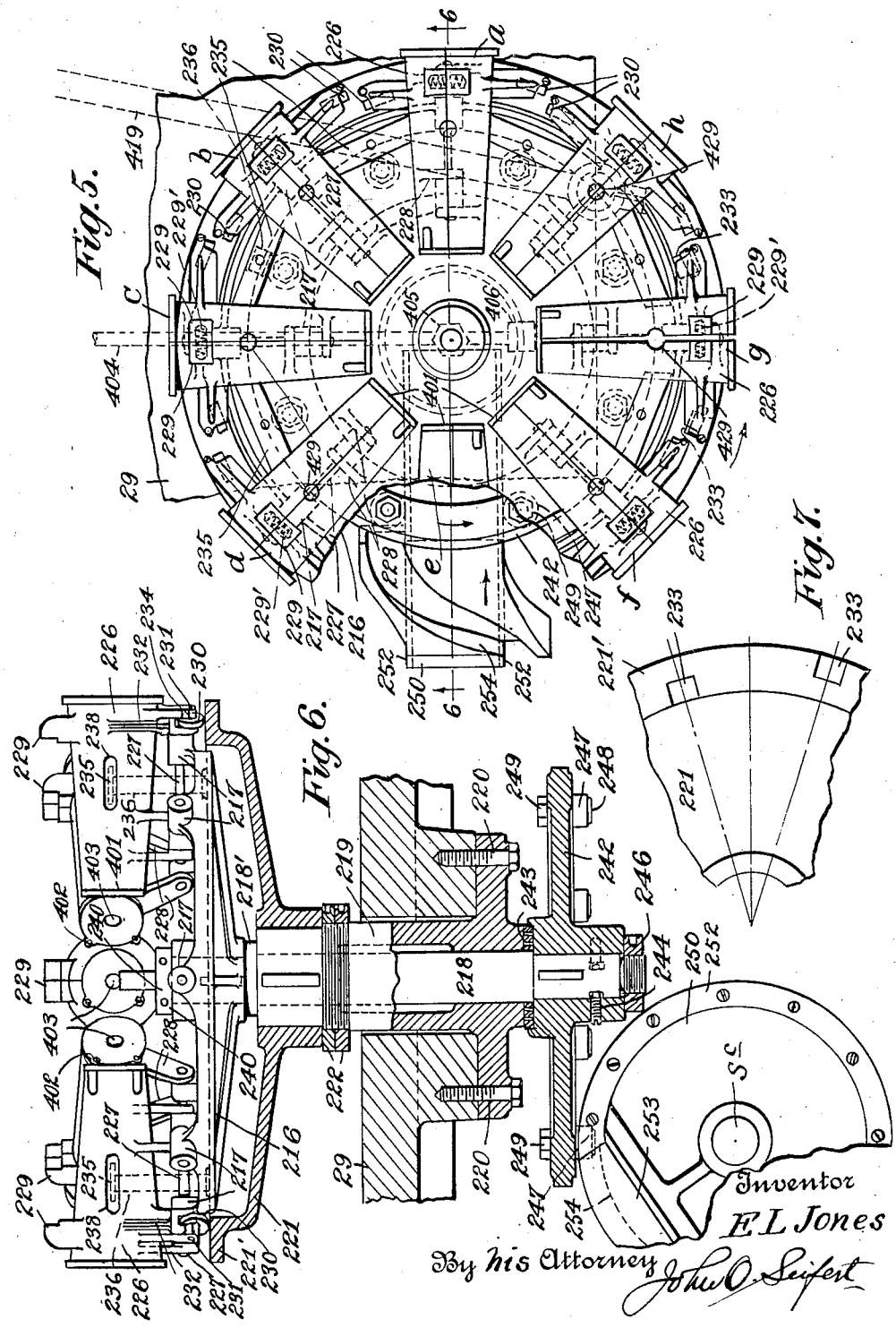

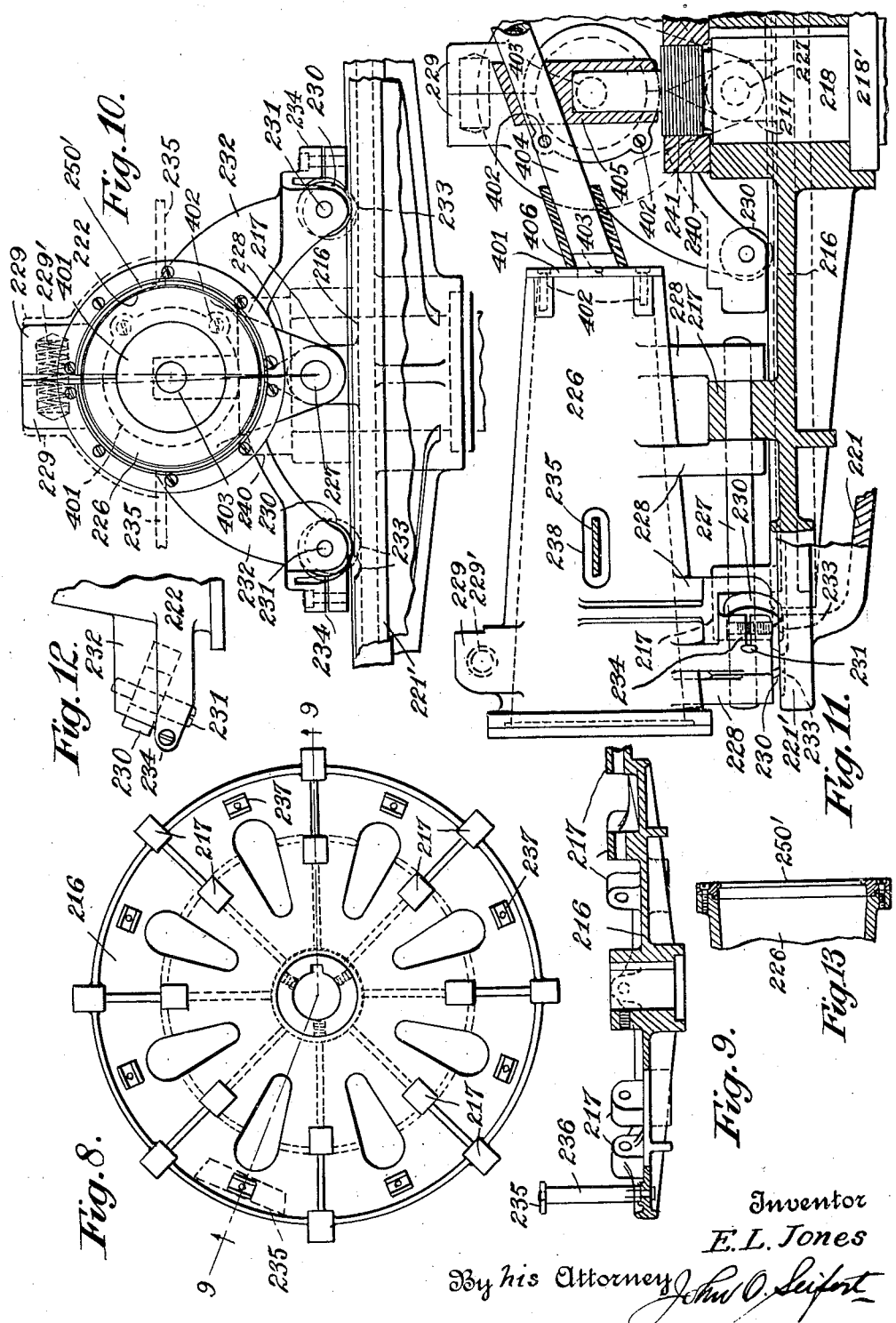

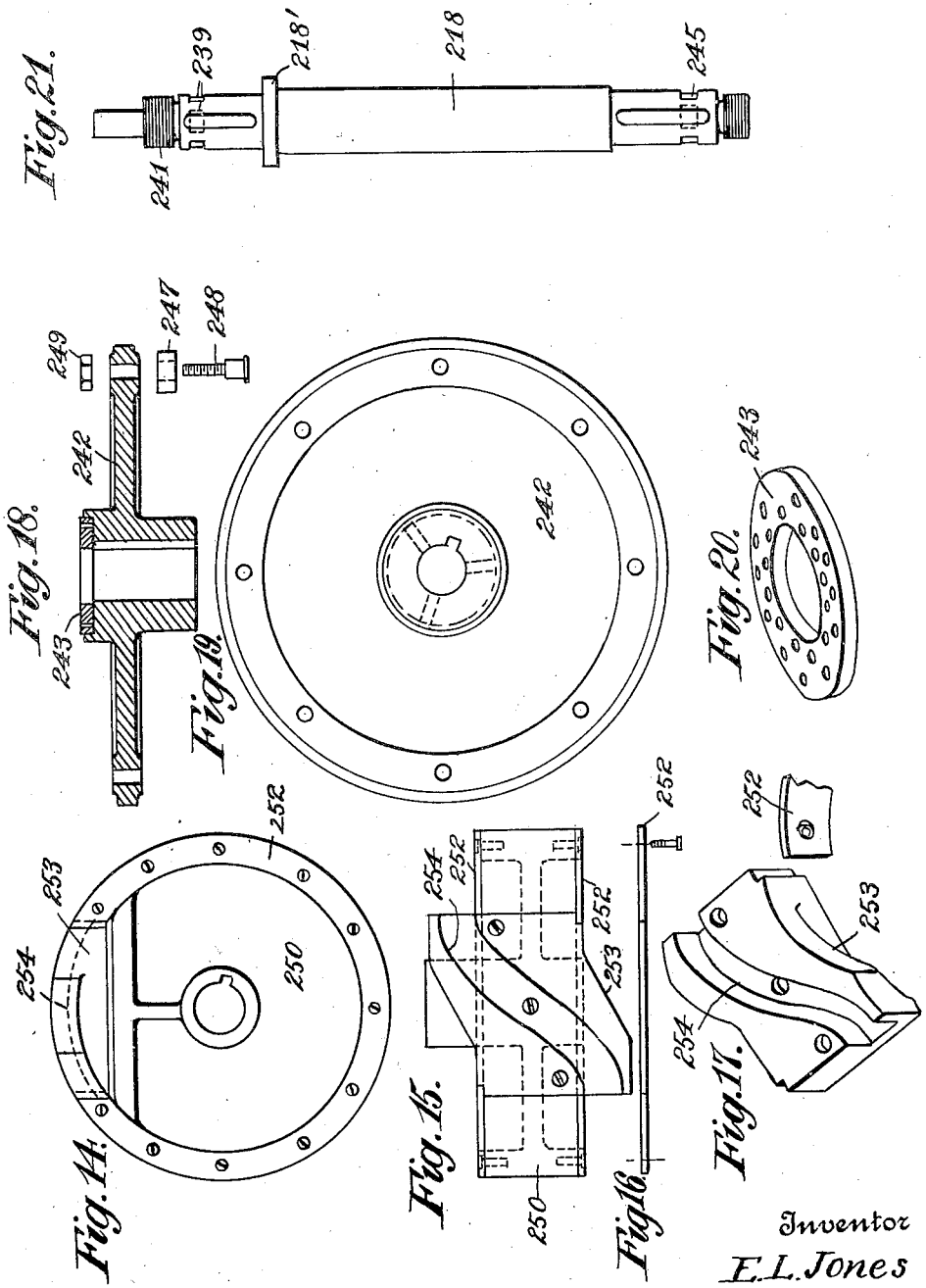

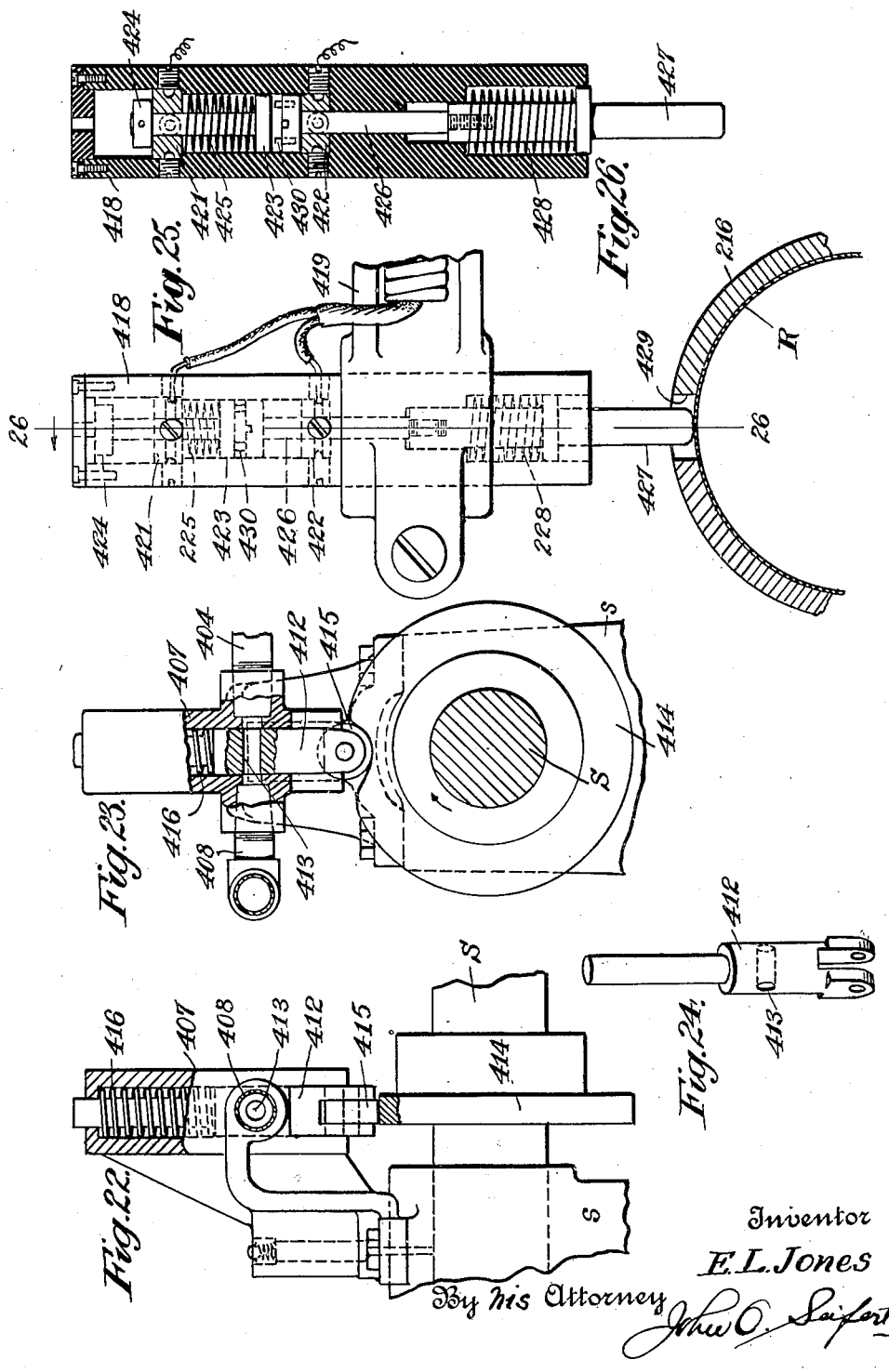

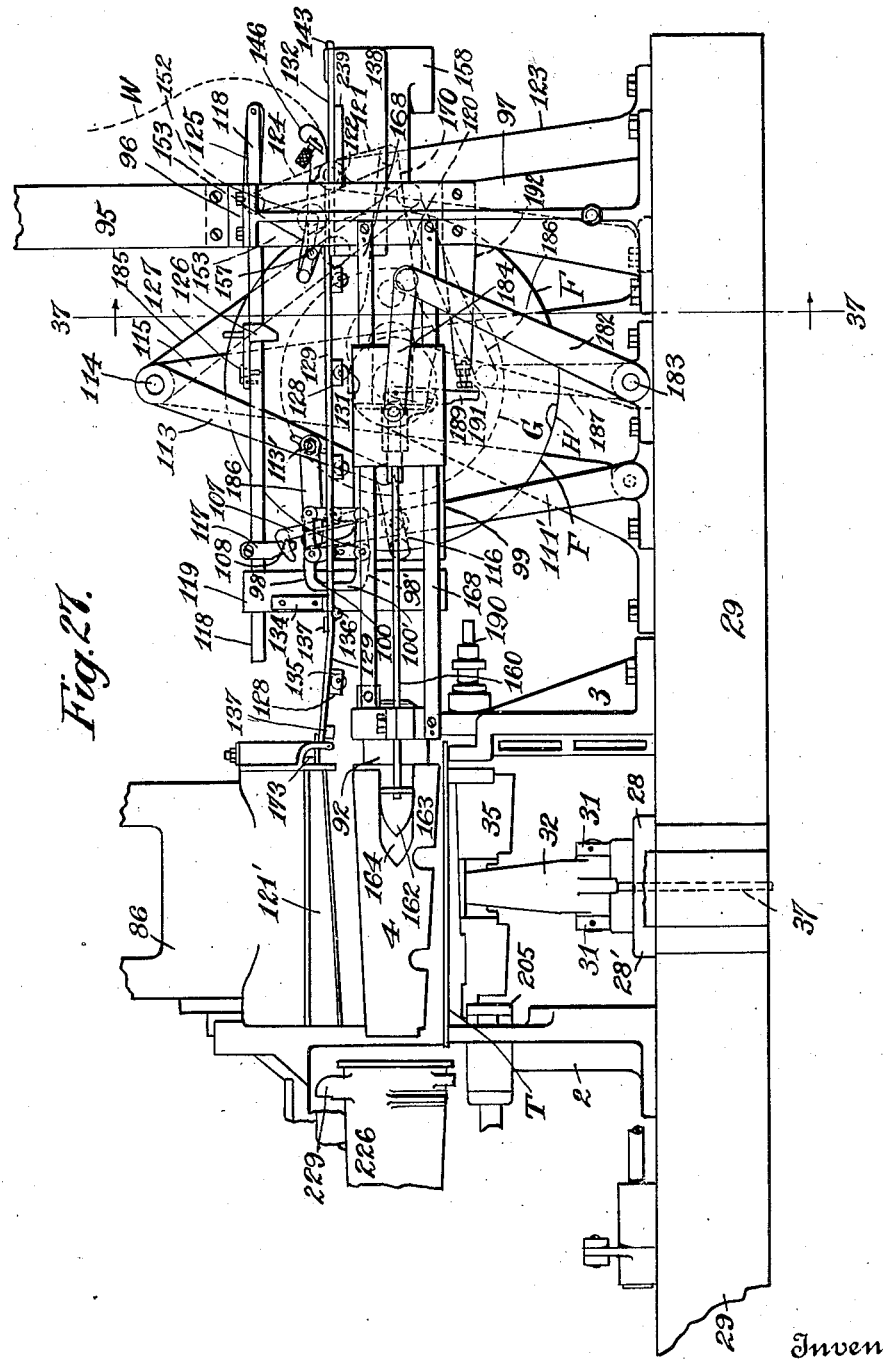

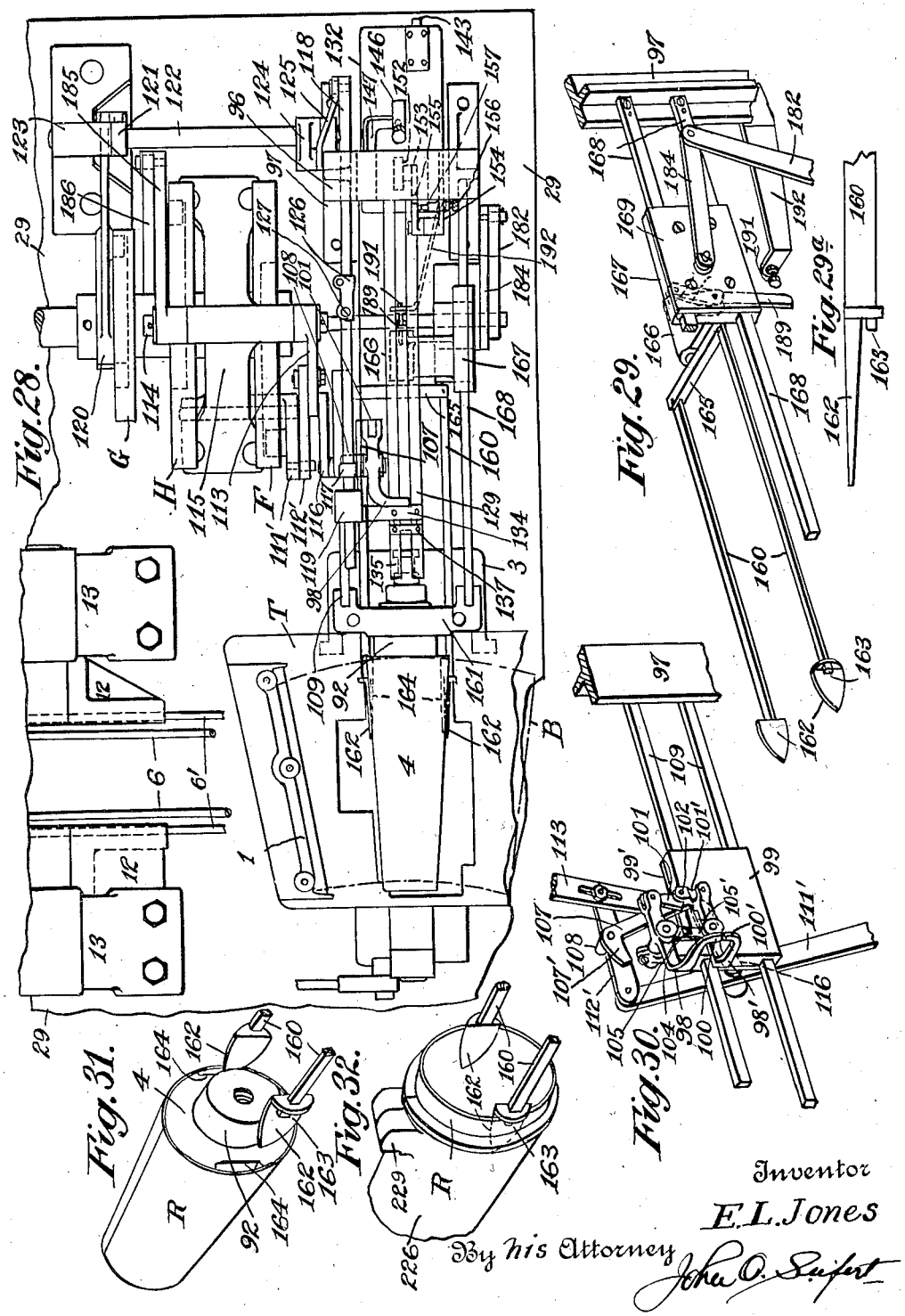

July 4, 1933.  E. L. JONES  1,916,981
RECEPTACLE MAKING APPARATUS
Filed Sept. 21, 1929  16 Sheets-Sheet 11
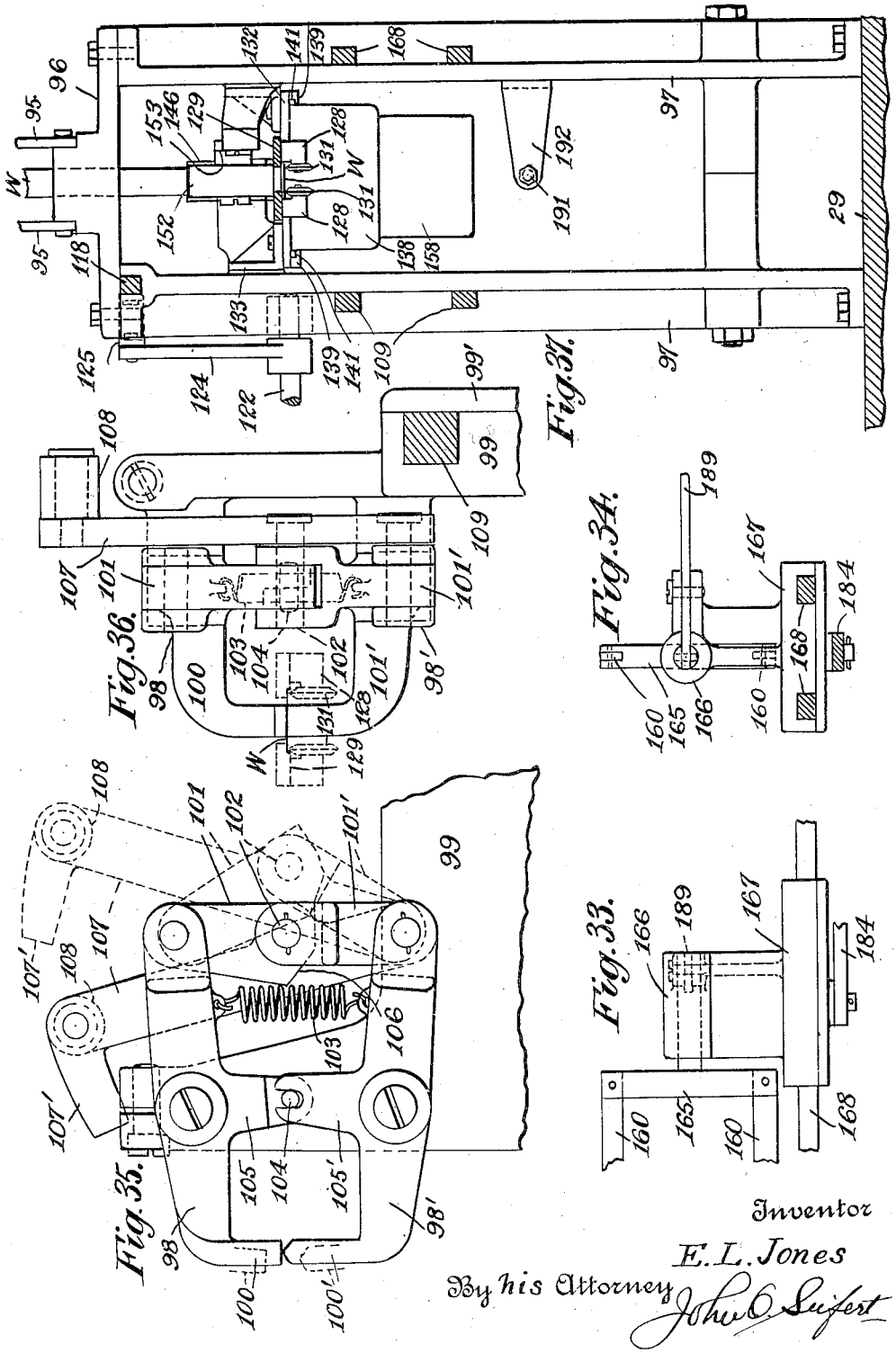
Inventor
E. L. Jones
By his Attorney

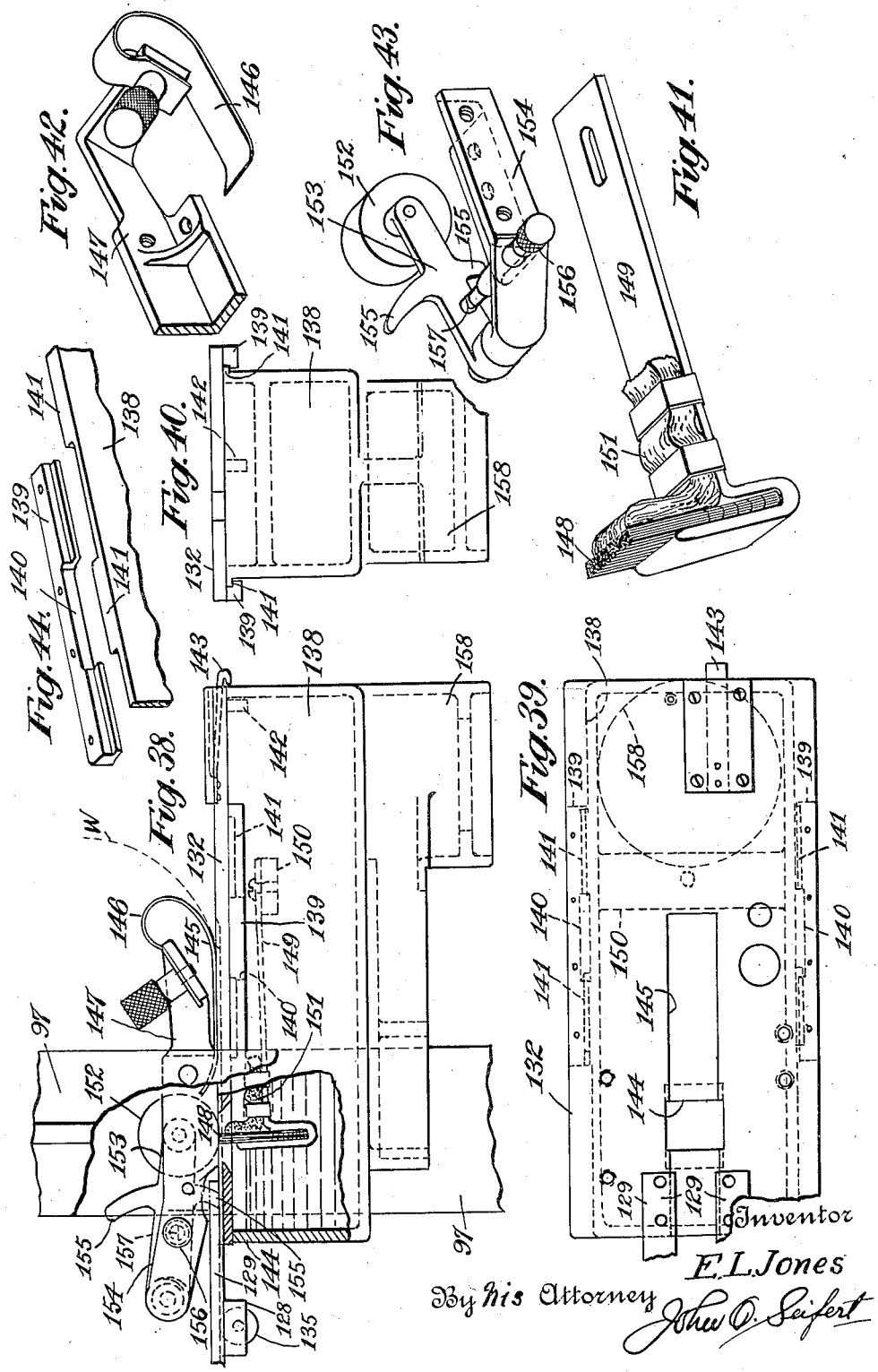

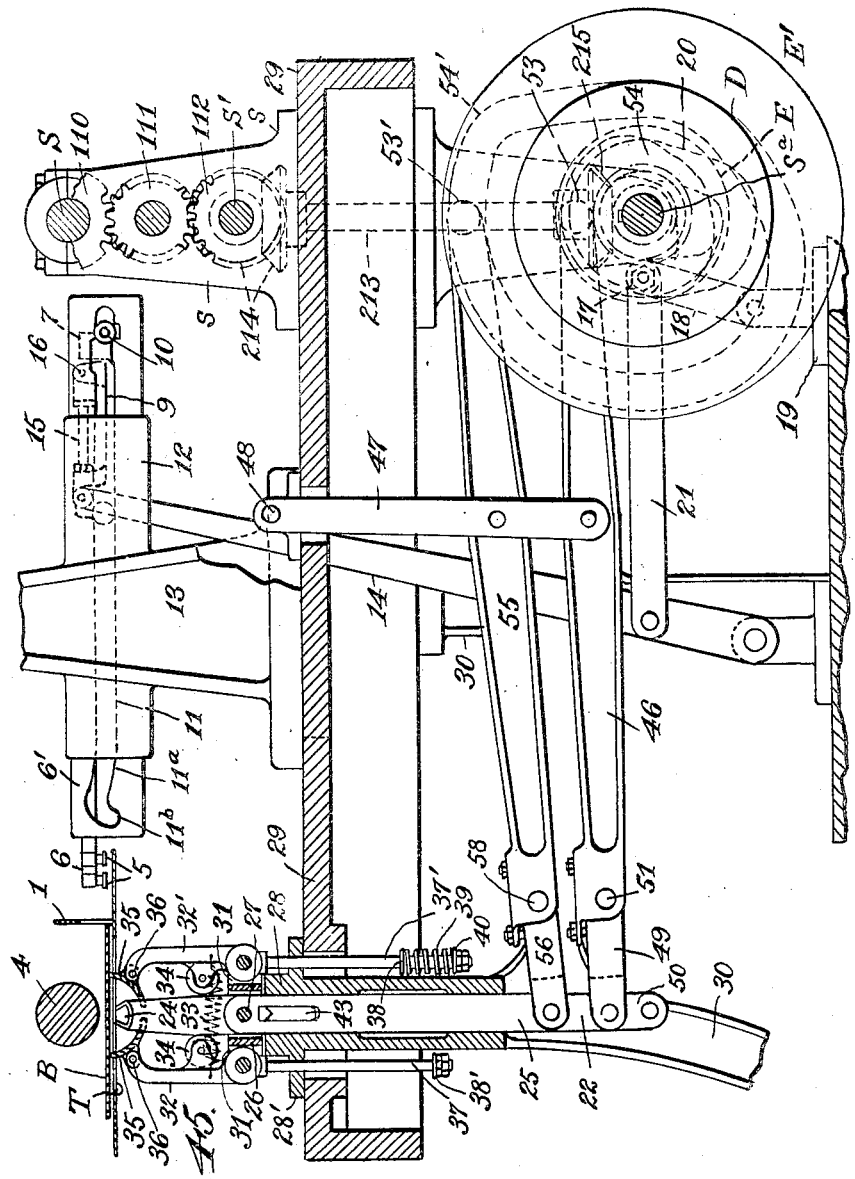

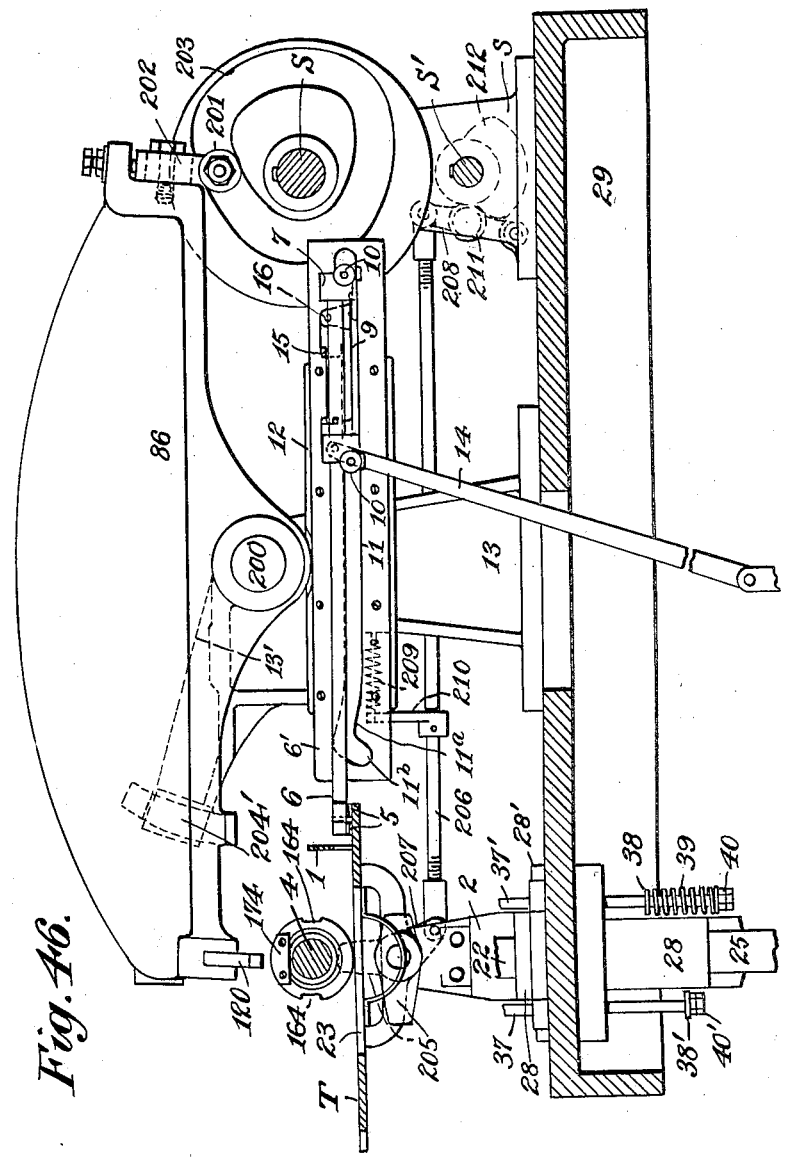

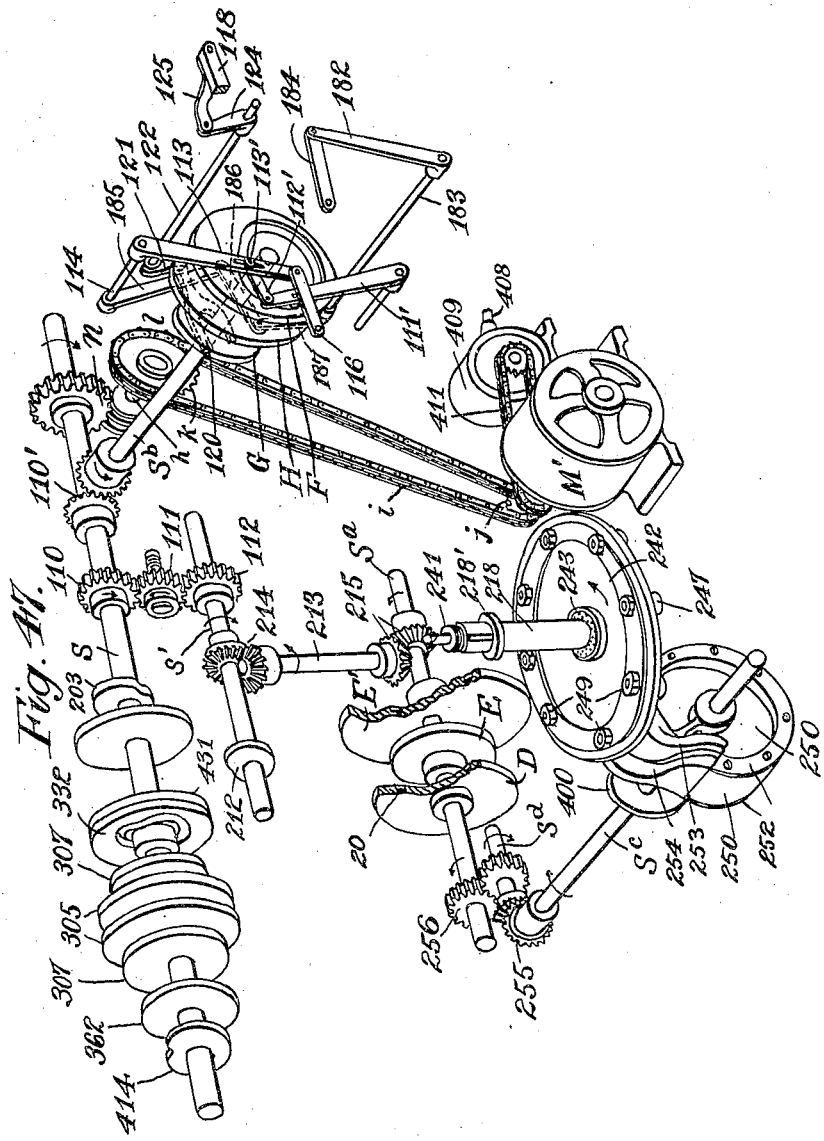

July 4, 1933.  E. L. JONES  1,916,981
RECEPTACLE MAKING APPARATUS
Filed Sept. 21, 1929  16 Sheets-Sheet 16
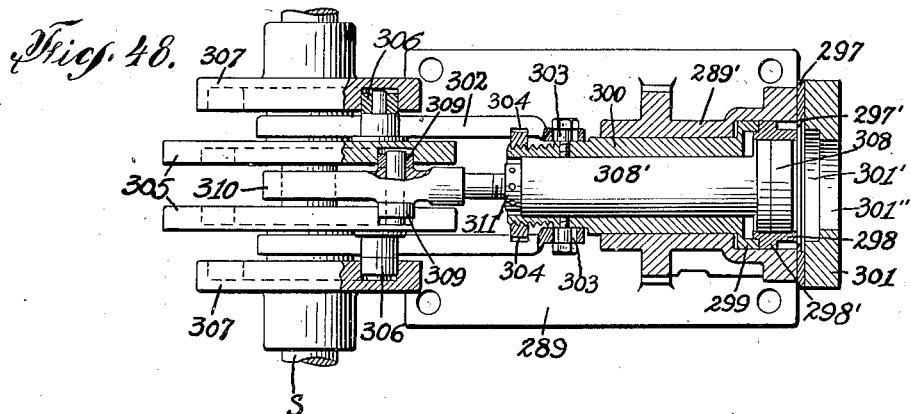
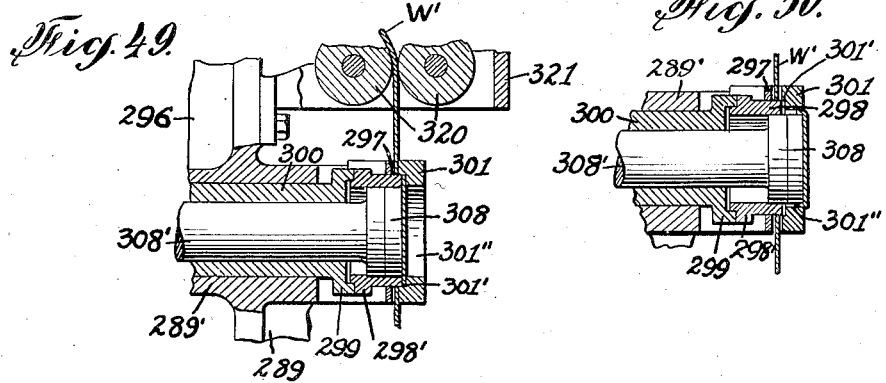
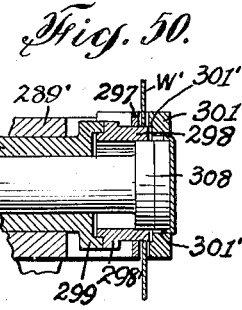
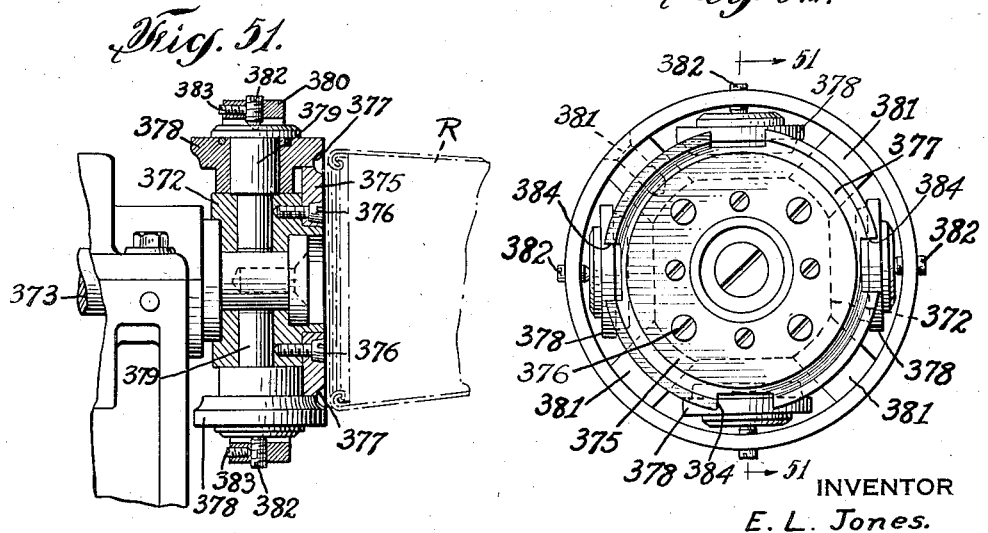
INVENTOR
E. L. Jones.
BY his ATTORNEY John O. Seifert Patented July 4, 1933

1,916,981

UNITED STATES PATENT OFFICE

ELLIS L. JONES, OF LONG ISLAND CITY, NEW YORK, ASSIGNOR, BY MESNE ASSIGNMENTS, TO AMERICAN SEALCONE CORPORATION, OF NEW YORK, N. Y., A CORPORATION OF NEW YORK

RECEPTACLE MAKING APPARATUS

Application filed September 21, 1929. Serial No. 394,315.

This invention relates to apparatus for making receptacle bodies and for forming a head or closure for the end of the receptacle or container body and secure the same therein to form a receptacle or container, the apparatus being of the type disclosed by Letters Patent No. 1,466,211 issued August 28th, 1923, wherein a sheet or blank of paper is wrapped around a mandrel and secured while on the mandrel at the longitudinal marginal portions by applying an adhesive strip or web thereto to form the receptacle body, which body is ejected from the mandrel and delivered to one of a series of holders equidistantly spaced about a carrier intermittently operative to successively present the holders with receptacle bodies therein to means to stamp a disk from a web, peripherally flange the disk and engage the flanged disk in the end of a receptacle body in a holder to serve as a closure therefor. The carrier is then rotated to advance the holder with the receptacle body having the flanged disk engaged therein to means to secure the flanged disk in the receptacle body by crimping or rolling together the disk flange and contiguous portion of the receptacle body, when the carrier is further rotated to advance the holder with the receptacle to position to eject the receptacle from the holder.

It is the primary object of the invention to improve the general construction and arrangement of apparatus of this character to render the same more efficient in operation and to produce a better receptacle.

It is an object of the invention to provide improved means for positively feeding a predetermined length of web relative to the marginal portions of a blank wrapped around the mandrel to serve as the securing and side sealing member for the receptacle body, and to provide improved means for moistening an adhesive surface of said web as it is fed to the mandrel.

Another object of the invention relates to an improved construction and arrangement of carrier for the holders to which the receptacle bodies are delivered from the mandrel, and to an improved construction and arrangement of the holders and mounting of the same upon the carrier.

A further object of the invention relates to improved means for actuating the holder carrier operative to impart intermittent movements to the carrier to successively advance the holders to the stations to receive a receptacle body from the mandrel, to means for forming the receptacle bottom and engaging the same in a receptacle body in a holder, to means to eject the formed receptacle from the holder, said holder carrier actuating means being also operative to hold the carrier against movement during the periods of rest thereof.

It is another object of the invention to provide pneumatic means operative in timed sequence with the actuation of the holder carrier to eject a formed receptacle from a holder.

It is a further object of the invention to provide electrically operated means to render the apparatus inactive should the holder carrier be advanced from the ejecting station without the ejecting of a receptacle from a holder, which receptacle in the holder, should it be advanced to the station to receive a receptacle body from the mandrel, would effect a jamming of the apparatus and possible breakage thereof, said means being operative from the receptacle in the holder.

Other objects and advantages will hereinafter appear.

In the drawings accompanying and forming a part of this application Figure 1 is a plan view of the apparatus illustrating an embodiment of the present invention.

Figure 2 is a side elevation looking at the bottom of Figure 1.

Figure 3 is an end elevation looking at the right of Figure 1.

Figure 4 is a section taken substantially on the line 4—4 of Figure 1 looking in the direction of the arrows.

Figure 5 is a plan view of the holders and carrier therefor, partly broken away to show the actuating means for the holders.

Figure 6 is a sectional view of the holder carrier and of its actuating means taken on the line 6—6 of Figure 5 looking in the direction of the arrows.

Figure 7 is a top view of a portion of a cam for controlling the opening and closing of the holder sections.

Figure 8 is a plan view of the holder carrier.

Figure 9 is a section taken on the line 9—9 of Figure 8.

Figure 10 is an end elevation of the holder showing the same in relation to the actuating cam for the holder sections.

Figure 11 is a side elevation, partly in section, of a holder showing the means for supporting the same and in relation to means to pneumatically deliver a receptacle therefrom.

Figure 12 is a detail view to show an adjustable mounting for supporting rollers for the holder sections.

Figure 13 is a side view of the open end portion of a holder section.

Figure 14 is a side view of the actuator for the holder carrier.

Figure 15 is a view looking at the top of Figure 14.

Figure 16 is an edge view of a wear plate for the holder actuator.

Figure 17 is a perspective view of a cam portion of the actuator for the holder carrier.

Figure 18 is a sectional view, and

Figure 19 is a plan view of a roller carrying wheel forming a part of the holder carrier to co-operate with the carrier actuator.

Figure 20 is a perspective view of a washer interposed between the wheel of Figure 19 and the support for the holder carrier.

Figure 21 is a side elevation of a shaft on which the holder carrier is mounted.

Figures 22 and 23 are elevational views, partly in section, of cam actuated valve mechanism for controlling the pneumatic means for ejecting the receptacles from the holders.

Figure 24 is a perspective view of a cam actuated valve plug of the mechanism shown in Figures 22 and 23.

Figure 25 is an elevational view of electric circuit closing means for rendering the apparatus inactive and operative by a receptacle in a holder after leaving the ejecting station.

Figure 26 is a sectional view taken on the line 26—26 of Figure 25 looking in the direction of the arrows.

Figure 27 is a side elevation of the means for feeding an adhesive strip relative to the marginal portions of a blank wrapped around the mandrel and showing the same in relation to the mandrel.

Figure 28 is a plan view of the parts shown in Figure 27.

Figure 29 is a perspective view of the means for ejecting a receptacle body from the mandrel.

Figure 29ª is a plan view of a portion of an ejector rod to show the mounting of a receptacle engaging finger plate thereon.

Figure 30 is a perspective view of the side sealing strip feeding means.

Figure 31 is a perspective view showing ejector fingers of the ejector mechanism about to engage a receptacle body on the mandrel to eject the body therefrom.

Figure 32 is a perspective view showing the ejector fingers having delivered a receptacle body into a holder.

Figures 33 and 34 are plan and end views of the ejector mounting.

Figures 35 and 36 are side and end elevations, on an enlarged scale, of the gripping means of the side strip feeding means and the actuating means therefor.

Figure 37 is a cross sectional view taken on the line 37—37 of Figure 27 looking in the direction of the arrows.

Figure 38 is a side elevation of a liquid carrying trough partly broken away to show the means to apply the liquid from the trough to and moisten an adhesive surface of the side sealing strip, and the means to guide the strip thereto.

Figures 39 and 40 are plan and end views of the trough shown in Figure 38.

Figure 41 is a perspective view of a brush for applying the liquid from the trough to the side sealing strip delivered relative thereto.

Figure 42 is a perspective view of means to guide the strip to the brush.

Figure 43 is a perspective view of means to maintain the strip in contact with the brush as the side sealing strip is delivered relative to the brush.

Figure 44 is a perspective view of a support and a portion of the trough to show the arrangement thereof for releasably mounting the trough on the support.

Figure 45 is a cross sectional view, on an enlarged scale, showing the means to deliver a receptacle blank to the table below the mandrel and the means for lifting the blank from the table, clamping it to and wrapping the same around the mandrel, and showing the latter means in normal inactive position.

Figure 46 is a cross sectional view, on an enlarged scale, of the means for delivering a receptacle blank to the table below the mandrel, a ram and its actuating means for applying the adhesive sealing strip to the marginal portions of a blank wrapped around the mandrel, and an adjustable mandrel support for the mandrel and actuating means therefor.

Figure 47 is a perspective view of the operating train from the source of power for the different mechanisms of the apparatus.

Figure 48 is a cross sectional plan view of punch and die mechanism to stamp a disk from a web and flange the same.

Figure 49 is a sectional side elevation of the punch, die and flanging mechanism taken substantially centrally through Figure 48.

Figure 50 is a view similar to Figure 49 but showing the parts in position to flange the disk stamped from the web.

Figure 51 is a sectional side elevation, taken on the line 51—51 of Figure 52 looking in the direction of the arrows, of a spinning head to fold a portion of the receptacle body over the edge of the disk flange and interfold the disk flange with the receptacle body and showing a portion of a receptacle body with an inserted flanged disk in dot and dash lines in relation to said means; and Figure 52 is a front elevation of the spinning head looking at the right of Figure 51.

In the embodiment of the invention illustrated in the drawings the operative mechanism of the apparatus is mounted on a suitable frame comprising standards A supporting a table 29, (Figure 2), and said mechanism is actuated from a drive shaft S journalled in standards s mounted upon the table 29, the drive shaft being operated from a motor M' by a chain $i$ passing around a sprocket wheel $j$ on the motor shaft and a sprocket wheel $k$ fixed to a shaft $l$ having a worm and worm wheel driving connection $n$ with the driving shaft S.

Blanks B (Figures 1 and 28) from which the receptacle bodies are formed are fed or delivered from a pile on a suitable support $a'$ onto a shelf or table T with an edge of the blank in register with a gauge 1 mounted upon the shelf. The shelf is mounted to extend in a horizontal plane upon standards 2, 3 fixed upon the table 29 below a mandrel or horn 4 and around which mandrel the blank delivered to the shelf is wrapped in forming the receptacle body. The means to feed the blanks to and wrap the same around the mandrel are the same as that disclosed in my copending application Serial #301,010.

The blanks are fed to the table T by suction means embodying suction cups 5 carried by tubes 6, (Figures 45 and 46,) and connected through a head 7 with vacuum creating means (not shown), the head 7 forming part of a carriage 9 supported by rollers 10 mounted thereon, engaging cam slots 11 in parallel and spaced plates 6' fixed to brackets 12 mounted upon standards 13 fixed upon the table 29. The carriage and suction cup carrying tubes are reciprocated transversely above the table by an arm 14 (Figures 45 and 46) pivotally supported below the table 29 and extending upward forward of the carriage and pivotally connected to a rod 15 connected at 16 with the carriage. The arm 14 is oscillated by a roller 17, carried by an arm 18 pivotally supported by a bracket 19 fixed upon the frame, engaging a cam groove 20 in a disk D fixed to a shaft $S^a$, and the arm 18 connected with arm 14 by a link 21. The shaft $S^a$ is operatively connected with a shaft S' through a vertical shaft 213 connected with the shafts $S^a$ and S' through bevelled gearing 214, 215, the shaft S' being driven from drive shaft S through a train of gears 110, 111, 112, as shown in Figure 47. As the suction cup carrying tubes are reciprocated they pass through openings in the gauge 1 and through recesses extended transversely through the bottom of the mandrel. The carriage rollers 10 as they approach the end of their forward movement ride up upwardly inclined portion $11^a$ of the cam slots 11 thereby elevating the suction cup carrying ends of the tubes for engagement upon the top of the supply pile of blanks $a$, and at the termination of such movement the carriage rollers ride down inclined portion $11^b$ of said slots and engage the suction cups with the uppermost blank on the pile. During the initial return movement of the suction tube carrying carriage the carriage rollers ride up the incline cam portion $11^b$ lifting the suction cups with the top blank from the pile. The carriage rollers then ride down the cam portion $11^a$ and positioning the blank on and drawing it over the table T, and as the leading edge of the blank registers with gauge 1 the blank is stripped from the suction cups, the retrograde movement of the carriage continuing until the suction cups are positioned to the rear of the gauge 1 and brought to rest.

During the interim of the movement of the suction cup carrying tubes means are operated to wrap the blank on the table T around the mandrel, comprising a plunger 22 moved upward through an opening 23 in the table T (Figure 46) to engage a pad 24 of yielding material carried by the plunger with the blank, lifting the blank from the table and clamping it to the mandrel, when a pair of plungers 25 are actuated, said plungers being juxtaposed to opposite sides of the plunger 22 and have longitudinal sliding movement toward and away from the mandrel with the upper ends terminating at a point below the upper end of the plunger 22. The plungers 25 extend up into a rectangular open head 26 pivotally supported on studs 27 secured in the plungers 25, (Figure 45) whereby the head may have rocking movement on the plungers. The plungers are slidably mounted in a guide member 28 extended through an opening of larger cross sectional area in the table 29, the guide having a flange 28' whereby it is supported upon the table 29. The head 26 has a pair of ears 31 extending outwardly from opposite sides and between which ears a pair of arms 32, 32' are pivotally supported, (Figure 45), and said arms extending upward and urged in a direction toward each other by a spring 33 to engage rollers 34 carried by the arms with the plunger 22 in the normal position of the plungers and during the initial movement of the arm carrying plungers 25. Flaps 35 are pivotally carried, as at 36, by the arms 32, 32', said flaps being of curved form in cross section to conform with the contour of the mandrel. As said arms are moved upward by plungers 25 the leading longitudinal edge of the flaps engage the blank at opposite sides of the mandrel. As the upward movement of the plungers is continued and as the flaps with the blank are brought into engagement with the mandrel the rollers 34 ride up opposite converging edge portions at the end of the plunger 22, and the flaps urged toward the mandrel by spring 33 holding the blank under tension and in taut condition against the mandrel. The receptacle blank is of a width so that one longitudinal marginal portion may be lapped over the other marginal portion on the mandrel, and to facilitate the overlapping of one marginal portion over the other marginal portion the blank wrapping movement of the flap carried by arm 32' is retarded. For this purpose rods 37, 37' are fixed at one end in the flap carrying arms to extend opposite to said arms, said rods being slidable in openings in the guide flanges 28' and extended through spaces between the guide and wall of the opening in the table 29 through which the guide is extended. As the plungers 25 approach the terminus of their upward movement a washer 38 on the rod 37' engages the table, said washer engaging the end of a spring 39 on the rod confined between said washer and lock nuts 40. The continued movement of the plungers causes the head 26 to rock on its pivot support, thereby permitting the flap carrying arm 32 to move in advance of the flap carrying arm 32'. This movement is continued until an abutment washer 38' retained on the rod 37 by nuts 40' engages the table arresting the blank wrapping movement of the flap carrying arm 32, and as the plungers 25 continue to move upward the spring 39 is compressed to its full extent, at which time the head 26 will be at a right angle to the plungers 25 and the blank wrapping movement of the flap carrying arm 32' arrested, when retorgrade movement is imparted to plungers 22 and 25. The head 26 is urged to position at a right angle to the plungers 25 by yielding compensating means 43 slidably mounted in the plungers 25 co-operating with the head.

The blank clamping plunger 22 is actuated by a lever 46 pivotally carried by an arm 47 pivotally suspended from a bracket 48 fixed to the table 29 and extended through an opening in said table, the lever having a pivotal and adjustable connection with plunger 22 through a connector 49 bifurcated to straddle the end of the plunger 22 extended below plungers 25 and pivotally connected with the plunger through links 50, and at the opposite end having a pivotal connection 51 with lever 46. The lever 46 is actuated by a roller 53 carried thereby engaging a cam groove 54 in a disk E fixed upon shaft $S^a$. The plungers 25 are actuated by a lever 55 pivotally supported intermediate the ends by arm 47 above the pivotal support of the lever 46, and operatively connected with the plungers 25 through a connector 56, similar to connector 49, by a bifurcated end thereof straddling the plungers 25 and pivotally connected therewith, and having a pivotal connection 58 with lever 85.

The lever 55 is actuated by a roller 53' carried by the lever engaging in a cam groove 54' in the face of disk E' fixed on shaft $S^a$.

The mandrel 4 comprises a truncated conical block, fixed by a reduced portion 92 at the larger end in the standard 3 for the blank supporting table T.

The blank wrapped around the mandrel is secured and sealed at the marginal portions to form the receptacle body by a strip applied to the receptacle blank over the marginal portions by a ram 86 movable toward and away from the mandrel, the sealing strip comprising a fed portion severed from a web W of suitable material, such as paper, having an adhesive surface, which surface is moistened and rendered viscous as the web is fed. The web is fed from a roll (not shown) rotatably supported by a pair of parallel standards 95 fixed to and extending upward from a crosshead 96 fixed upon standards 97 on the table 29.

The web feeding means comprises a pair of grippers mounted in the rear of the large end and in line with the mandrel and reciprocatory toward and away from the mandrel, the grippers being operative to grip and positively feed a predetermined length of the web as they are moved in a direction toward the mandrel, and to release the web at the termination of such movement and during the return movement thereof. This gripping means, as illustrated in Figures 27, 28, 30 and 35 to 37, comprises a pair of levers 98, 98' pivotally mounted intermediate the ends to have movement on parallel axes on a reciprocatory carriage in the form of a slide 99. The ends of the levers are extended laterally at substantially a right angle and in parallel relation to each other with the extremities extended toward each other, as shown at 100, 100', the one end 100 being substantially flat while the other end 100' is beveled to have a point or line contact with the flat end of the other lever, and to constitute the web gripping surfaces of the levers. The opposite ends of the levers are connected by toggle links 101, 101' by pivotally mounting the same on pins in bifurcations at said ends of the levers, and the links are pivotally connected by the engagement of the link 101 in the bifurcated end of link 101', as at 102, and the levers are normally yieldingly urged in a direction away from each other by a spring 103 connected to the toggle link connected ends of the levers. The levers are connected to transmit the movement of one lever to the other by a pin and slot connection 104 between arms 105, 105' extended laterally from the levers in line with their pivotal supports. To limit the spreading movement of the gripping end of the levers by the spring the one toggle link 101 at the pivotal connection with the other toggle link is increased in width and has a corner at the juncture of one side edge with the end bevelled, as at 106, whereby when the toggle is broken and the toggle connected ends of the levers are moved toward each other by the spring 103 said bevelled portion will engage with the connecting portion of the bifurcated legs of link 101', as shown in dotted lines in Figure 35. The movement of the gripping levers to web gripping and releasing positions is controlled by a latch 107 mounted on the pivotal connection 102 of the toggle links and the pivotal connection of toggle link 101' with the gripper lever 98', as clearly shown in Figures 35 and 36, said latch carrying a roller 108 on a stud extended laterally therefrom and opposite to the gripper levers. The gripper carrier 99 comprises a block having parallel recesses therein for mounting on a pair of rails 109 and retained thereon by a plate 99' releasably secured to the block, the rails being mounted at one end upon a standard 97 and at the opposite end upon the supporting standard 3 for the blank receiving table T and mandrel.

The gripper carrier is reciprocated from driving shaft S through a shaft $S^b$ (Figures 1, 3, 27, 28, 37 and 47) operatively connected with the drive shaft through bevel gearing 110', (Figure 47), and the gripper carrier operatively connected with said shaft $S^b$ by a roller carried by a lever 111' engaging a cam groove in a disk F fixed on the shaft. The lever is pivotally supported upon and extends upward from the table 29 and is operatively connected with the gripper carrier through a link connection 112' between said lever and a lever 113 loosely hung on a shaft 114 in a standard 115 fixed upon the table (Figure 3), said lever having a link connection 116 with a gripper carrier. The connection between link 112' and lever 113 is intermediate the ends of the lever and is adjustable, as shown at 113' in Figure 47, whereby to vary the movement of the lever 113 and thereby the travel of the gripper carrier and length of the web fed.

To actuate the toggle link operating latch 107 as the gripper carrier reaches the termination of its web feeding movement, the latch roller 108 engages a stop 117 adjustably mounted on a slide rod 118 slidably mounted in the standard 97 on which the supporting rails 109 for the gripper carrier are mounted (Figure 37) and a bracket 119 fixed upon the rails 109. As the latch roller engages said stop the slide 118 is moved in a direction reverse to the web feeding movement of the gripper carrier thereby moving the latch to the position shown in dotted lines in Figure 35 with the toggle links 101, 101' moved to exhausted position and permitting the gripper jaws to be moved to the dotted line position by spring 103 and releasing the jaws from the web. This movement is imparted to the stop carrying slide by a roller carried by a link 120 engaging a cam groove in a disk G on shaft $S^b$, the link being bifurcated and straddling said shaft. The link is connected with an arm 121 fixed to a shaft 122 rotatably mounted on a standard 123 and a bearing member fixed to one of the standards 97, said shaft being connected with the stop carrying slide by an arm 124 fixed to said shaft having a link connection 125 with the slide. It will be obvious that by adjusting the stop 117 on the slide the time at which the grippers are released from the web may be varied and thus effecting variations in the length of web fed.

To move the gripper levers to web gripping position at the termination of their retrograde movement and before the commencement of the web feeding movement of the gripper carrier, a second stop 126 is mounted on the slide 118 for engagement of the latch roller 108 to actuate the latch to move the toggle links 101, 101' to straightened position, as shown in full lines in Figure 35. The cam groove in cam disk G is arranged whereby the stop carrying slide 118 will be operated in the interim of the retrograde and web feeding movement of the gripper carrier to actuate the latch 107 to move the toggle links to straightened position and the grippers to web gripping position. The stop 126 is pivotally mounted on the slide at 127 whereby it may be adjusted to position out of the path of movement of the latch roller 108 with the result that no web gripping movement will be imparted to the gripper levers as the gripper carrier is reciprocated and no feeding of the web effected. The latch 107 is arranged with a pallet 107' to guide the latch relative to the stops.

The web W is delivered by the web feeding means with the adhesive surface lowermost to interposed relation between the mandrel 4 and ram 86, the latter being operative to apply the web or strip under pressure to the marginal portions of the blank wrapped around the mandrel. The web is guided to said position by guiding means comprising a pair of sections, one section being fixed and embodying angle blocks 128 fixed to and spaced longitudinally of a pair of parallel and spaced rails 129 with the blocks suspended from the rails in opposed pairs with the angle portion of the opposed blocks extended toward each other and the inner marginal portions of the rails overhanding said angle portion of the blocks, as shown in Figure 37. The web is supported as it is fed by rollers 131 rotatably carried by the blocks, the periperal portion of the rollers being of V shape in cross section to have only a limited contact with the web. The rails 129 are supported at one end upon a plate 132 fixed upon angle brackets 133 fixed to the standards 97, the plate extending from the ends of and with the upper surface in a plane with the guide rails to constitute a continuation thereof. The opposite ends of the rails are supported by an angle bracket 134 fixed to the member 119. By the spacing of the rails the gripping jaws of the feeding means are adapted to engage the web and move the same longitudinally of the rails. The other section 135 of the guiding means is pivotally connected at 136 to one end of the guide rails 129 and has a similar connection with the ram 86 to participate in the movement of the ram toward and away from the mandrel. The guide section 135 embodies one pair of roller carrying blocks 128 and a pair of guide rails 129 connected by cross pieces 137. The web is delivered from the guide section 135 between a pair of guide plates 121' yieldingly carried by the ram, and a cutter 173 carried by the ram severing the portion of the web fed relative to the mandrel and the ram as the ram is moved to the mandrel.

The adhesive surface of the web W is moistened as it is fed to render it viscous, and for this purpose a liquid carrying trough 138 is removably mounted upon the bottom of the plate 132, which plate serves as a closure for the trough. To mount the trough on the plate gibs 139 (Figure 44) are fixed to the bottom of the plate at the opposite marginal portions, said gibs having an intermediate cut away portion 140. Longitudinally spaced cleats 141 are fixed to the sides of the trough adjacent the top to have sliding engagement with the gibs. To mount the trough on the plate the one portion of the cleats is positioned opposite the cut away portion of the gibs to position the top of the trough contiguous to the plate when the trough is moved longitudinally into sliding engagement with the gibs. The trough is releasably held against longitudinal displacement relative to an abutment 142 fixed to and extending downwardly from the plate and engaging the inside of the end wall of the trough by a yielding latch 143 carried by the plate engaging the end of the trough. The plate has an opening 144 therein in relation to a recess 145 in the plate in line with the guideway between the rails 129, the web being retained and guided in said recess by a yielding presser 146 carried by a bracket 147 fixed to a standard 97. As the web is delivered over the opening 144 liquid is applied to the under adhesive surface by a brush comprising bristles 148 carried by a holder of resilient material 149 (Figures 38 and 41) mounted on a cross bar 150 in the trough and tensioned to normally assume a position with the bristles extended through the plate opening, the liquid being applied to the bristles by capillary attraction by an absorbent material 151 arranged on the holder contiguous to the bristles. The web is maintained in contact with the bristles by a roller 152 (Figures 38 and 43) carried by an arm 153 pivotally mounted on a bracket 154 fixed to a standard 97 to which the presser carrying bracket 147 is fixed. The roller engages and maintains the web in contact with the bristles by gravity. A pair of ears 155 are extended oppositely from the roller carrying arm, one to engage the plate 132 to limit the movement of the roller toward the bristles and the other ear to support the roller carrying arm from a guide rail 129 when the roller is moved out of contact with the portion of the web superposed to the bristles. To prevent a momentary disengagement of the roller from the web and bristles by the sudden movement of the web during the commencement of the feeding thereof, a detent pin 156 is carried by the bracket 154 and yieldingly urged by a spring in a direction toward the roller carrying arm to engage over an abutment 157 fixed in and extending laterally from said arm. A tubular projection 158 is extended downward from the bottom of the trough for the removable connection of a heater, such as an electric heater (not shown) should it be desired to heat the liquid in the trough.

To supply liquid to and maintain it at a predetermined level in the trough a substantially air tight liquid carrying receptacle 432 is carried by a bracket fixed to a standard 97, an outlet tube 433 leading from the bottom of the receptacle to the trough. A tube 434 opens to and extends into the trough to an extent below the desired liquid level in the trough and has a connection with the receptacle adjacent the top thereof and an air space above the liquid level in the receptacle. Should the liquid level in the trough fall below the end of the tube 434 air is admitted to the receptacle effecting a flow of the liquid from the receptacle to the trough until it reaches a level above and seals the end of the tube 434 in the trough when the flow of the liquid is automatically shut off. Liquid is supplied to the receptacle through a tube 435 connected with the outlet tube and having the inlet thereto adjacent the top of the receptacle and provided with a funnel. To control the delivery of liquid through the tube 435 to the receptacle instead of to the trough and flooding the same a two-way valve is arranged in the connection of the supply tube with the outlet tube, indicated in a general way at 436. The valve is arranged to shut off the outlet tube from the trough when the supply tube is connected with the receptacle, and to shut off the supply tube from the receptacle and the outlet tube when the receptacle is connected with the trough through the outlet tube.

The formed receptacle body is ejected from the mandrel by an ejector mechanism, (Figures 1, 2, 3 and 27 to 34) comprising a pair of parallel ejector rods 160 slidably guided at 161 in an upward extension of the mandrel supporting bracket 3 to have longitudinal movement at opposite sides of the mandrel. Angle plates, in the nature of fingers, the opposite edges of one angle portion 162 of which converge toward each other and are of progressively decreased thickness outward, as shown in Figure 29ª, are secured to the ends of the ejector rods with a reduced portion of the rods extended through the other angle portion and spaced from the angle portion 162, as at 163. The mandrel has diametrically opposite longitudinal recesses 164 therein and the ejector rods are spaced apart a distance so that the edge of a receptacle body R will engage the space between the portions 162 of the plates and the extended ends of the ejector rods. The ejector rods are carried by and connected through a head 165 with a reciprocatory carrier therefor by slidably engaging a stud forming a part of and extended from the head 165 opposite to the ejector rods in a tubular portion, as at 166, of a part extended laterally from a slide block 167 of the carrier arranged with parallel recesses in the opposite face for the slidable engagement of supporting rails 168 fixed to a standard 97 and the mandrel supporting bracket 3, the slide block 167 being retained on the rails by a plate 169 secured to the block. The ejector rod carrier 167 is reciprocated by an arm 182 fixed to a rock shaft 183 and having a link connection 184 with the carrier. The shaft 183 is rocked from a rocker arm 185 hung on the shaft 114 having a link connection 186 with an arm 187 fixed to shaft 183, the arm 185 being rocked by a roller on said arm engaging a cam groove in a disk H fixed to the shaft S^b. To impart an added increment of movement to the ejector rods greater than that imparted thereby by the carrier to assure the delivery of the body from the mandrel, the movement of the ejector rods being only substantially the length of the mandrel, a lever 189 is pivotally carried in a slotted portion extended downward from the tubular portion 166 of the carrier 167. The stud of the head 165 is of greater length than said tubular portion and one end of the lever 189 is pivotally connected to the end of said stud extended from the tubular portion, the opposite end of the lever extending below the carrier. As the carrier approaches the termination of its ejecting movement the downward extending end of the lever 189 will engage with an adjustable abutment 190 rocking the lever and thereby imparting an increment of movement to the ejector rods in addition to that imparted thereto by the carrier therefor. At the termination of the retrograde movement of the ejector carrier 167 said extended end of the lever engages an adjustable abutment 191 carried by an arm 192 fixed to one of the standards 97 and thereby imparting an additional increment of retrograde movement to the ejector rod carrying head 165 and the rods.

To provide an additional support for the mandrel to prevent springing of the mandrel as the ram is brought into engagement therewith, and to also permit of the ejecting of a receptacle body from the mandrel, an adjustable auxiliary support is provided for the free end of the mandrel. (Figures 2 and 46.) This support is in the form of an arm 205 rotatably supported in a recessed portion of the standard 2 and normally assuming the position shown in full lines in Figure 46, and moved to mandrel supporting position shown in dotted lines just prior to the ram engaging with the mandrel by a rod 206 pivotally connected to an arm 207 fixed to the mandrel supporting arm and pivotally connected with a lever 208 pivotally carried by a standard s and normally urged to position the auxiliary support out of mandrel supporting position by a spring 209 attached to an arm 210 on the rod and a fixed part of the frame. The auxiliary mandrel support is moved to mandrel supporting position by a roller 211 carried by lever 208 following a cam 212 fixed on shaft S'.

The receptacle bodies R as they are ejected from the mandrel 4 are delivered to one of a series of tubular holders mounted on and equidistantly spaced about a carrier disk 216 having two series of circumferentially disposed and upwardly extending lugs or bearing members 217 (Figures 5 to 11) upon which the holders are mounted, the disk being fixed to a vertical shaft 218 (Figure 21) rotatable in a sleeve 219 extended through an opening in the table 29 and secured thereto by screws extended through openings in a flange on the sleeve and threaded into the table, as at 220, the shaft being supported in said sleeve by a flange 218' resting on the upper end of the sleeve. A head 221 is mounted on the sleeve below the carrier disk, the head being keyed to the sleeve to hold it against rotation and adjustably supported upon a pair of collars 222 threaded onto the sleeve. The head is of dished form and extends around the carrier disk and has an annular flange 221' extending laterally of and in a plane slightly above the bottom of the carrier disk. In the present instance there are eight of said receptacle body holders, designated by a, b, c, d, e, f, g and h, respectively, (Figures 1 and 5). The holder carrier is intermittently rotated to successively position the holders at station a relative to the mandrel 4 of the receptacle body forming means to receive a receptacle body therefrom. Upon the successive movement of the carrier the holder with a receptacle body therein is stationed at b, from which it is advanced to station c adjacent means to stamp a disk from a web W', peripherally flange the disk, and insert the flanged disk in the end of a receptacle body in a holder to form a bottom closure for the receptacle body and simultaneously arrange the receptacle body with an annular shoulder and seating the flanged disk thereagainst. From said station c the holder is advanced to station d to subject the receptacle body in the holder to the action of spinning means to primarily turn in or fold the marginal end portion of the receptacle body over the edge of the disk flange, when the holder is advanced to station e to subject the receptacle body with the bottom closure therein to the action of second spinning means to finally interfold the receptacle body with the disk flange to secure the bottom disk in the end of the receptacle. From the station e the holders are advanced to station f where no operation is effected, and from said station to station g where the receptacle is pneumatically ejected or delivered from the holder, when the empty holders are advanced to station h and from said latter station to the station a adjacent to the mandrel 4. As the successive holders are advanced from the station a to the stations c, d, e and g a receptacle body is arranged in each of the successive holders to be acted upon by the means at said stations.

Each of the receptacle body holders comprises a pair of complemental sections 226 substantially of semi-circular shape in cross section and of tapered or truncated conical form pivotally supported on the holder carrier to extend upwardly therefrom at one longitudinal marginal portion on parallel axes extending longitudinally of the holder and the sections adapted to be moved toward each other into mating relation and laterally of each other or spread. To pivotally support the holder sections they are loosely mounted upon shafts 227 engaged in perforated ears 228 extending laterally and downwardly from the holder sections. The shafts 227 are fixed in the disk carrier lugs 217 (Figure 11). Each of the sections has a laterally and upwardly extended lug 229 adjacent the forward end and when the sections are in mating or closed position extending in parallel and opposed relation, (Figure 10) springs seated in recesses in said lugs, as shown at 229', normally urging the holder sections away from each other. The holder sections are normally moved to and held in closed position against the tension of springs 229' by a pair of rollers 230 riding upon the flange 221' of head 221, which is in the nature of a cam, said rollers being rotatably mounted on a stud 231 in the bifurcation of a pair of arms 232, one extended laterally from each holder section. The head flange 221' at the stations a and g is arranged with recesses 233 (Figures 7 and 10) in which the rollers 230 engage due to the force of the springs 229' slightly spreading the holder sections to facilitate the engaging of a receptacle body in a holder ejected from the mandrel 4 as well as the ejecting of a receptacle from a holder at the station g. To regulate the mating connection of the holder sections the supporting studs 231 for the rollers are mounted in concentric openings in the bifurcated legs of the arms 232, the intermediate portion of the studs upon which the rollers are mounted being eccentric to the axis of the studs, (Figure 12,) and by rotatably adjusting the studs the axis of rotation of the rollers are adjustable relative to the arms 232. To facilitate the adjustment of the studs they are provided with screw driver slots and the one bifurcated leg of the arms is split and adapted to be drawn together with a screw to clamp the studs in adjusted position, as shown at 234. To release and facilitate the ejection of the receptacles from the holder sections as they are spread at station g plates 235 (Figures 9 and 10) are fixed upon posts 236 mounted upon bosses 237 upon the carrier disk 216, said plates being of a length and positioned with the opposite ends engaging in openings 238 in the holder sections of a pair of juxtaposed holders to an extent so that the ends of the plates when the holder sections are in closed position will be substantially flush with the inner surface of the holder sections and be projected into the holders to strip a receptacle therefrom when the holder sections are spread and thus release the receptacles from the holders. The holder carrier is secured upon the shaft 218 in abutting relation to the flange 218' by set screws threaded into the hub of the carrier engaging recesses 239 (Figure 21) in the shaft, and a collar 240 engaged on a threaded portion 241 of the shaft and abutting against the carrier hub.

To intermittently rotate the holder carrier to advance the holders to the successive stations and hold the carrier against movement during the periods of rest, a disk or wheel 242 (Figures 2, 4, 6, 18 and 19) is secured upon the reduced end of the shaft 218 extended below the sleeve 219 with a perforated washer 243, to facilitate lubricating, interposed between the hub of the disk and said sleeve, the disk being keyed to the shaft and secured thereto by set screws 244 threaded into the hub of the disk and into the recesses 245 in the shaft, and a nut 246 threaded onto the shaft. The disk carries a series of rollers 247, these rollers being equal in number to the holders and stations and equidistantly spaced around the peripheral portion of the disk. The rollers are arranged at the under face of the disk rotatably carried on enlargements of headed and threaded studs 248 engaged in perforations in the disk and secured therein by nuts 249 threaded on the studs.

The disk 242 is intermittently actuated from a drum 250 (Figures 1, 2, 6, 14 to 17 and 47) fixed on a shaft $S^c$ journaled in hangers 251 fixed on table 29, the drum being in line with the axis of the supporting shaft 218 of the holder carrier, and the path of movement of the disk rollers 247 intersect the axis of the drum intermediate the ends thereof. The drum is of a length equal to the spaces between and has a driving fit with the disk rollers 247, the opposite ends of the drum being provided with annular wear pieces 252 of wear resisting material secured thereto by screws. A block 253 (Figure 17) of greater width than the length of the drum is mounted in a peripheral recess in the drum with a part extending from opposite ends thereof and has a sinuous cam groove 254 therein extending transversely of the periphery of the drum for engagement of a disk roller 247 to advance the disk as the cam drum is rotated. The drum is rotated in the direction indicated by the arrow in Figures 2 and 47 and during the periods of rest of the holder carrier a disk roller 247 engages at opposite ends of the drum with the following disk roller in line with the entrance to the cam groove 254, and as the drum cam is positioned with the entrance to the cam groove above and slightly in advance of the axis of the drum carrying shaft the following disk roller will engage the cam groove and rotative movement will be imparted to the holder carrier a distance equal to the distance between the stations of the holders, the disk roller as it passes from the cam groove being engaged at the opposite end of the drum. One intermittent movement is imparted to the holder carrier upon each revolution of the cam drum. The shaft $S^c$ is driven from a shaft $S^d$ through bevelled gearing 255, and shaft $S^d$ is driven from shaft $S^a$ through gearing 256, the shaft $S^d$ being journaled in hangers 257 carried by table 29.

The receptacle holders are of a length slightly less than the length of the receptacles so that a portion of the larger end of a receptacle body will project from the holder when engaged therein. At the station $c$ a holder is positioned relative to bottom forming means operative to stamp a disk from a web W', peripherally flange the disk, engage the flanged disk in the end of the receptacle body projecting from the holder, and simultaneously with the engaging of the flanged disk in the receptacle body arranging the body with a shoulder and seating the flanged disk against said shoulder. The construction and operation of this means is the same as that described in my co-pending application hereinbefore referred to, and comprises punch and die mechanism carried by standards 289 mounted on the table 29, a support 296 for a roll of web being fixed upon and extending upward from said standard. The punch and die mechanism (shown in detail in Figures 48 and 50) embodies a die in the form of a plate 297 having an opening therethrough and fixed in axial relation to the end of a tubular portion 289' of standard 289, said die plate having a recess 297' in the outer face to provide a space for the passage of the web across said plate relative to the opening therein. The exterior of a tubular punch head 298 is arranged at one end with a portion 298' of rectangular form which is connected to a similarly formed rectangular portion 299 at the end of a tubular plunger 300 slidably mounted in the tubular portion 289' of the standard 289, and said punch head 298 and end 299 of the tubular plunger slidably engaging in a bifurcated portion at the end of the tubular portion 289' of the standard, whereby the plunger and punch are held against rotative movement. A die block 301 having an opening therethrough arranged with two diameters 301', 301" is fixed to the plate 297 with the portion of the opening of greatest diameter adjacent to said plate. The punch carrying plunger 300 is reciprocated to actuate the punch to stamp a disk from a web by a pair of arms 302 connected at one end to diametrically opposite sides of the punch carrying plunger 300 by engaging screws in elongated openings in the offset ends of the arms and threading the same into the punch carrying plunger, as at 303, to permit of adjustment of the punch carrying plunger and arms relative to each other, and the arms being adjustably connected with the punch carrying plunger by a collar threaded onto the end of the punch carrying plunger engaging in recesses in the arms, as at 304, with the opposite ends of the arms bifurcated and straddling hubs of disk cams 305 and carrying rollers 306 engaging cam grooves in the faces of disks 307 on shaft S. As the punch 298 is moved by the punch carrier 300 relative to the die plate 297 it will stamp or sever a disk from the web W' fed relative to the opening in the die plate and after the disk is stamped from the web it is successively positioned in the portion of the opening of greatest diameter 301' in the die block 301, and peripherally flanged (Figure 50) by a head 308 of a plunger 308' forcing the disk through the portion of the opening of reduced diameter 301" in the die block 301. The plunger 308' is slidably mounted in the tubular punch carrying plunger 300 and reciprocated by rollers 309 rotatable on the projecting ends of a pin extended through a yoke member 310 engaging cam grooves in the disks 305, the yoke having an adjustable connection 311 with the plunger. Simultaneously with the flanging of the disk it is inserted into the end of a receptacle body R in a holder stationed relative to said punch and die mechanism, the movement of the plunger being of an extent and the disk flange of a length so that the end of the receptacle body will project beyond the disk flange. Simultaneously with engaging of the flanged disk in the receptacle body the latter is formed with a shoulder against which the flanged disk or closure is seated. To arrange this shoulder in the receptacle body the plunger head 308 with the flanged disk thereon is of a diameter which is substantially the mean diameter of the projecting portion of the receptacle body, and as it engages said portion of the receptacle body it moves the body slightly longitudinally into the holder and firmly seats it therein, and during this movement of the receptacle body into the holder it is moved past an annular rib at the entrance to the holder formed by an inwardly extending flange 250' on segments secured to the end of the holder sections, (Figure 13) effecting an annular contraction of the receptacle body. The continued movement of the plunger longitudinally displacing the projecting portion of the receptacle body and folding it laterally over the holder rib 250' forming the shoulder against which the flanged disk is seated. The tubular punch 300 is actuated by cam followers on arms 302 engaging cam grooves in disks 307 on the shaft S, the arms being connected to opposite sides of the punch. The plunger 308 is reciprocated by cam followers on a member 310 engaging cam grooves in the opposed faces of disks 305, the member 310 being connected with the plunger.

To prevent springing of the holder sections as the bottom disk is engaged into a receptacle body therein, abutment means are provided relative to which the holders are positioned as they are moved to the bottom forming means at station c, and comprising a plate 437, (Figure 4) fixed upon an angular portion forward of the tubular portion 289', the plate having an opening for the passage of the web W' and extends forward of the die mechanism, the extremity being arranged with a downwardly extending flange 438 back of which the holder lugs 229 are adapted to be engaged.

The bottoming web W' is fed intermittently in timed sequence with the operation of the punch and die mechanism by a pair of rollers 320 carried in a frame 321 fixed to and extending forward from the standard 289 above the die mechanism. The rollers are positively driven one from the other through gearing 324 intermittently rotated by a pawl 328 co-operating with a ratchet wheel 327 connected through gearing 325 with the rollers the pawl being carried by an arm 330 which is oscillated to impart ratchet wheel feeding movement to the pawl by a cam follower carried by said arm engaging a cam groove in a disk 333 on shaft S.

To strip the body and bottom disk engaged therein in a holder from the web and prevent the withdrawing of the same from the holder during the receding movement of the plunger 308, means are provided for engaging the edges of the receptacle body and bottom disk on the plunger, said means being operated by a cam follower carried by a connector 361 engaging a cam groove in a disk 362 fixed to the shaft S. The connector has a toggle link connection 358 with said mechanism. As such mechanism does not constitute a feature of the present invention detailed description and illustration thereof is not deemed necessary.

After the flanged bottom disk has been inserted in a receptacle body in a holder at station c the holder carrier is actuated to advance said holder from station c successively to stations d and e where the projecting end of the body and the flange of the bottom disk are subjected to the action of spinning heads, indicated in a general way at 380. The spinning head at station d turns or folds the end of the receptacle body over the disk flange, and the spinning head at station e interfolds inward the end of the receptacle body and disk flange. The spinning heads are fixed to shafts 373 rotatably and slidably mounted in bearings carried by standards 373' and operatively connected with the shafts of motors M mounted upon the table 29 to rotate with and have axial movement relative to said shafts. The connections between the spinning head shafts and motor shafts comprises pins 385 fixed in a collar 386 slidably engaging in openings in collars 387 fixed to the motor shafts. The spinning head carrying shafts are reciprocated to move the heads into and out of operative relation with receptacle bodies in holders positioned adjacent the heads by rollers 391 engaging in annular recesses in sleeves 386, said rollers being carried by pins extended inward from the legs of a bifurcation at the end of levers 389. The levers are fixed to rock shafts 390, 392 rotatably mounted in the standards 373'. The shafts are rocked in synchronism by a lever 394 fixed to shaft 392 having universal joint connection 395 with an arm 396 fixed to shaft 390, the lever 394 being actuated from the holder carrier actuating shaft $S^c$ by a roller 398, shown in dotted lines in Figure 2, carried by link 399 engaging a cam groove in a cam 400 fixed to shaft $S^c$, the link having pivotal connection at one end with the lever 394 and arranged with a bifurcation at the opposite end to straddle said shaft. The spinning heads are actuated in timed sequence with the actuation of and during the periods of rest of the holder carrier.

Both of the spinning mechanisms are of the same structure (Figures 51 and 52) and illustration and description of one will suffice for both. Each spinning mechanism comprises a head 372 mounted on the reduced end of the shafts 373 with a disk 375 secured upon a reduced portion at the front of the head by screws, as at 376, and has a peripheral recess 377 of arcuate form in cross section. A series of four rollers 378 are rotatably carried upon the enlarged portion of the shouldered and headed studs 379 mounted in and spaced equidistantly about the head 372, said studs being retained in position on the head by an annulus or ring 380 encircling and secured to the head by headed screws passed through openings in the ring and threaded into projections extending laterally from the head, as at 381, set screws 382 threaded into openings in said ring engaging the end of the roller carrying studs, and said set screws locked in position by said screws 383. The rollers have an annular enlargement and the disk 375 has cut outs through which a peripheral portion of said roller enlargement extend, as at 384, the rollers having a recess of arcuate form to register with the arcuate recess 377 in disk 375 and form therewith a recess of semi-circular form in cross section, which recess, when the one head is brought to the receptacle R will turn the end of the receptacle inward over the disk flange, and when the other head is brought to the receptacle folding said turned in portion of the receptacle end with the disk flange inwardly upon themselves and thereby form a disk securing seam.

From stations d, e the holders are successively advanced to stations f and g, no operation being effected at the station f, but at station d the receptacle is ejected from the holder. At said station the holder sections are spread by the rollers 230 carried by the holder arms 231 engaging the recesses or depressions 233 in the flange 221' of head 221 by the action of the spring 229', the ends of the plates 235 mounted on the holder carrier between the adjacent holders engaging with and releasing the receptacle from the holder sections as hereinbefore described.

The receptacles are ejected or delivered from the holders at station g pneumatically. For this purpose a plate 401 is arranged at the inner and smaller ends of the holders, said plates being secured upon one holder section by screws passed through perforations in the plate and threaded into bosses on the one holder section, as at 402, the plates having perforation 403 centrally thereof. As the carriers are brought to rest at the ejecting station g the plate perforations are brought into register with a conduit 404 mounted in an opening in a support 405 loosely mounted on the reduced upper end of shaft 218 (Figure 11) and a substantially air tight connection is made between the conduit plate opening by a rubber sleeve 406 engaged upon the conduit.

The conduit 404 leads from a chamber in a valve casing 407 mounted upon one of the supporting standards s for the shafts S, (Figures 1, 2, 4, 22, 23 and 24), and through said valve casing connected by a conduit 408 with a compressor 409 mounted on a shelf 410 with the motor M', and operatively connected with the motor by a sprocket chain 411 passing around sprocket wheels on the shafts of the motor and compressor. The conduit 404 is momentarily brought into communication with the compressor by a valve plug 412 in the valve casing to impart an ejecting impulse to the receptacle in the holder. The conduits 404, 408 are connected with the valve casing in alinement, and the valve plug has a transverse bore 413 which is normally positioned out of position with the conduit connections with the valve casing by a cam disk 414 fixed on shaft S engaging a roller 415 rotatably carried in the bifurcated end of the valve plug, the valve plug being yieldingly urged to position the roller into engagement with the cam disk by a spring 416 coiled about the reduced end of the valve plug within the valve casing. As the holder is brought to rest at the ejecting station g the valve roller engages a recess or depression in the periphery of the disk 414 (Figure 23) when the valve port 413 is brought into register with the connections of the conduits with the valve casing and the perforation in the plate of the receptacle carrying holder is opened to the compressor. The roller only engages momentarily in the disk recess, and as it rides out of such recess the valve port is again positioned out of register with the conduit connections with the valve casing.

Should a receptacle not be ejected from a holder at the ejection station g a holder with the receptacle therein by the successive movement of the holder carrier would be positioned at station a to receive a further receptacle body, but the receptacle in the holder would prevent engagement of such receptacle body in the holder with the result that there would be a jamming of the apparatus and possible breakage of parts. Means are, therefore, provided to render the apparatus inactive should a holder leave the ejecting station g with a receptacle retained therein. This means comprises electrically controlled means for operating switch mechanism (designated in a conventional manner at 417) interposed in the circuit of the motor M' with its source of current supply, the operation of said switch operating mechanism being set in operation by a receptacle in a holder as it is brought to rest at station h. This switch controlling means comprises normally open circuit making means carried in a casing of insulator material 418 carried by a lever 419 superposed to a holder at station h, the lever being pivotally supported at 420 by one of the supports 13 for the ram 86 (Figure 1). This circuit closing means (Figures 1, 2, 25 and 26) comprises a pair of contact terminals 421, 422 fixed in the casing 418 arranged for connection of conductors connected in circuit with the switch controlling means. A headed stem 423 is slidably mounted in the terminal 421 to have rubbing contact therewith and is normally urged to predetermined position with the collar 424 in engagement with the terminal by a spring 425. A headed stem 426 also is slidably mounted in the contact terminal 422 to have rubbing contact therewith, said stem having a threaded connection with a plunger 427, preferably of insulating material, extended from the end of the casing 412 and normally urged outward from said casing to a predetermined position with the end of the stem in engagement with the contact terminal by a spring 428 coiled about the plunger and confined between a collar or flange on said plunger slidably engaging an enlargement in the casing and the shoulder formed by said casing enlargement. The casing is positioned with the plunger in line with an opening 429 arranged in the mating edges of the holder sections, and as the holder carrier is brought to rest with a holder at station h the lever is rocked in a direction toward the holder. Should there be no receptacle in the holder the plunger will pass through the opening into the holder without imparting circuit closing movement to the circuit closing means. However, should there be a receptacle in the holder, as shown in Figure 25, the plunger will engage the receptacle and be moved into the casing against the tension of spring 425 and thereby bringing contact pins 430 carried by the head to stem 426 into contact with the head of stem 423 closing the circuit and setting the switch actuating means in operation to open the motor circuit. The apparatus will remain inactive until the receptacle is removed from the holder at station h.

The lever 419 is actuated from shaft S by a roller carried at the end of the lever opposite to the circuit closing means engaging a cam groove in a disk fixed to shaft S, as at 431.

The ram 86 is in the form of a lever of hollow structure pivotally supported intermediate its ends, (Figures 3 and 46) in standards 13 by trunnions 200 extended laterally from opposite sides thereof, the ram being rocked to move an anvil 120 carried by the end extended over the mandrel into and out of engagement with the mandrel by a roller 201 carried by a bracket 202 adjustably connected to the opposite end of the ram lever engaging a cam groove in a disk 203 fixed to shaft S, the ram being guided in its movement and held against lateral distortion due to the connection of the ram with its actuating cam by a block carried by and extending laterally from opposite sides of an arm 13' extended from one of the standards 13 in a direction toward the anvil carrying end of the ram and engaging arcuate recesses in the opposite inner surfaces of the wall of the ram, as at 204'. The movement of the anvil carrying end of the ram toward the mandrel may be varied by adjusting the carrying bracket 202 for the cam following roller.

It will be obvious that various modifications may be made in construction and arrangement of parts, and that portions of the invention may be used without others without departing from the scope of the invention.

Having thus described my invention I claim:

1. In receptacle forming apparatus, a disk rotatable on a vertical axis having perforated lugs equidistantly spaced about and extended upward from the top face of the disk, shafts mounted in the lug perforations, holders for receptacle bodies each comprising a pair of sections pivotally supported upon a shaft to extend upward from and beyond the periphery of the disk, and each holder section having a laterally and downwardly extending arm, rollers carried by said arms, a spring interposed between the holder sections exerting a spreading force on the sections, a fixed annular member extended around the disk upon which said rollers ride to maintain the holder sections in mating relation against the tension of the spring, and means to intermittently rotate the holder carrying disk.

2. Receptacle forming apparatus as claimed in claim 1, wherein the annular member is arranged with depressions at predetermined points about the same into which the rollers carried by the arms of the holder sections ride and permit of the spreading of the holder sections by the spring.

3. Receptacle forming apparatus as claimed in claim 1, wherein the rollers are concentrically mounted on eccentric positions of studs mounted for adjustment in the arms of the holder sections to vary the mating position of the holder sections.

4. In receptacle forming apparatus as claimed in claim 1, means operative through openings in the holder sections to engage and release a receptacle from a holder when the rollers carried by the holder sections ride into the depressions in the annular member and the holder sections are spread by the holder spring.

5. In receptacle forming apparatus as claimed in claim 1, plates fixed intermediate the ends on posts mounted on the disk in interposed relation to the holders, the ends of said plates extending through openings in a section of adjacent holders and terminating substantially with the inner surface of the holder sections with the holder sections in mating relation and adapted to be extended into the holders to strip a receptacle therefrom when the rollers ride into the depressions in the annular member and the holder sections are spread by the holder springs.

6. In receptacle forming apparatus, a rotatable disk, an annular fixed member extending around the disk, holders for receptacle bodies equidistantly spaced about and extending radially of a face of the disk, each holder embodying a pair of sections of semi-circular shape in cross section and pivotally supported on an axis extending longitudinally of one edge of the sections to have movement toward and away from each other, and the sections having parallel and opposed lugs extended therefrom opposite to the pivotal support, a spring seated in recesses in said lugs and exerting a spreading force upon the holder sections, and rollers carried by each holder section to ride upon the annular member by the rotation of the holder carrier disk and maintaining the holder sections in predetermined mating relation against the action of the spring, and means to rotate the holder carrying disk.

7. Receptacle forming apparatus as claimed in claim 6, wherein the rollers are mounted concentrically on an eccentric portion of studs carried by the holder sections to have rotative adjustment, and means to secure the roller carrying studs in adjusted position.

8. In apparatus for bottoming receptacle bodies, a rotatable carrier having a series of body holders equally spaced about and extending radially thereof, receptacle body forming means, means for forming bottom disks and inserting the same in receptacle bodies in the holder, means to secure the bottom disks in the bodies, means to eject the bodies with bottom disks therein from the holders, and means operative by a receptacle in a holder after leaving the ejecting station to render the apparatus inactive, said several means being spaced about the holder carrier, and means to intermittently actuate the holder carrier, to successively station the holders relative to said means.

8. In apparatus for bottoming receptacles as claimed in claim 8, wherein the holders are provided with a perforate closure at one end, and means to eject the receptacles from the holders comprising pneumatic means relative to which the perforation in the closures for the one end of the holders are registered at the ejecting station.

10. In apparatus for bottoming receptacles as claimed in claim 8, wherein the holders are provided with a perforated closure at one end, and pneumatic means at the ejecting station relative to which the perforation in the closure for the one end of the holders are registered at the ejecting station and comprising a conduit leading from a compressed air supply and having an outlet arranged in the path of movement of the closure perforation of the holders and brought in register with the closure perforation during the periods of rest of the holder carrier, valve mechanism interposed in the connection of the conduit with the compressor normally shutting off the compressed air supply from the conduit, and means to operate the valve alternately with the movement of the holder carrying disk to connect the conduit with the compressed air supply to deliver an ejecting air impulse to the receptacle in a holder.

11. Apparatus for bottoming receptacle bodies as claimed in claim 8, wherein the holder carrier is in the form of a disk, and the holders comprise longitudinally separable sections pivotally supported on an axis extending longitudinally of one edge of the sections and extending upward from the disk, means to yieldingly urge the said sections to spread position, rollers carried by the sections, and an annular member extended around the holder carrying disk upon which said rollers ride and maintain the sections in predetermined mating relation against the action of the yielding means, said annular member being arranged with depressions for engagement of the rollers when the holders are stationed at the receptacle body forming means and the ejecting means to permit the yielding means to spread the holder sections to facilitate the engagement of receptacle bodies in the holders and the ejection of the receptacles from the holders.

12. Apparatus for bottoming receptacle bodies as claimed in claim 8, wherein the cam to intermittently rotate the holder carrier and disk is operatively connected with and driven from a drive shaft, an electric motor operatively connected with the drive shaft having an electrically operated control switch connected in the circuit thereof with its source of current supply, and means operative by a receptacle in a holder at a certain station to actuate the switch and render the motor and cam inactive.

13. In apparatus for bottoming receptacle bodies as claimed in claim 8, a drive shaft to which the cam to intermittently rotate the holder carrier and disk is operatively connected, an electric motor operatively connected with the drive shaft and having an electrically operated control switch connected in the circuit thereof with its source of current supply, and normally open circuit closing means connected in circuit with the control switch adapted to be closed by a receptacle in a holder at a certain station to actuate the control switch and render the motor inactive.

14. In apparatus for bottoming receptacle bodies as claimed in claim 8, a drive shaft to which the cam to intermittently rotate the holder carrier and disk is operatively connected, an electric motor operatively connected with the drive shaft and having an electrically operated control switch connected in the circuit thereof with its source of current supply, and normally open circuit closing means connected in circuit with the control switch adapted to be closed by a receptacle in a holder at a certain station to actuate the control switch and render the motor inactive, comprising a lever carrying the circuit closing means including a plunger, a cam on the drive shaft to rock said lever to extend the plunger into and withdraw it from an opening in the holders.

15. In apparatus for bottoming receptacle bodies as claimed in claim 8, a drive shaft to which the cam to intermittently rotate the holder carrier and disk is operatively connected, an electric motor operatively connected with the drive shaft and having an electrically operated control switch connected in the circuit thereof with its source of current supply, and normally open circuit closing means connected in circuit with the control switch adapted to be closed by a receptacle in a holder at a certain station to actuate the control switch and render the motor inactive, comprising a casing of insulating material, contact terminals in the casing arranged for connection of electric conductors to connect the terminals in circuit with the control switch, contact makers slidably carried by and in electrical connection with said contact terminals and one urged to predetermined position out of contact with the other, and one of said contact makers carrying a plunger normally extended from the casing, a lever carrying said casing, and a cam on the drive shaft to rock the lever to extend the plunger into and withdraw it from an opening in the holders, and said plunger adapted to engage a receptacle in a holder and through the engagement thereof with the receptacle move the one contact maker into engagement with the other contact maker.

Signed at the city of New York, in the county of New York, and State of New York, this 19th day of September, A. D. 1929.

ELLIS L. JONES.